United States Patent [19]
Sato

[11] Patent Number: 5,287,197
[45] Date of Patent: Feb. 15, 1994

[54] SIGNAL DEMODULATION DEVICE

[75] Inventor: Koichi Sato, Itabashi, Japan

[73] Assignee: Asahi Kogaku Kogyo Kabushiki Kaisha, Tokyo, Japan

[21] Appl. No.: 685,673

[22] Filed: Apr. 16, 1991

[30] Foreign Application Priority Data

| Apr. 20, 1990 | [JP] | Japan | 2-105602 |
| Apr. 20, 1990 | [JP] | Japan | 2-105603 |
| Apr. 20, 1990 | [JP] | Japan | 2-105604 |
| Apr. 20, 1990 | [JP] | Japan | 2-105605 |
| Apr. 20, 1990 | [JP] | Japan | 2-105606 |

[51] Int. Cl.$^5$ .......................... H04N 9/88; H04N 5/94
[52] U.S. Cl. .................................. 358/336; 358/314;
  360/38.1; 375/94; 375/84; 348/643
[58] Field of Search ............... 358/23, 35, 314, 310,
  358/327, 330, 336, 148; 360/38.1, 33.1, 35.1,
  14.1, 40, 29; 329/310, 309, 306; 375/84, 83, 94,
  95; H04N 9/65, 9/66, 9/88, 5/94

[56] References Cited

U.S. PATENT DOCUMENTS

| 4,618,830 | 10/1986 | Mori et al. | 375/84 |
| 4,628,271 | 12/1986 | Takayama | 375/84 |
| 4,746,872 | 5/1988 | Yamagata | 375/84 |
| 4,827,357 | 5/1989 | Kawakami . | |

FOREIGN PATENT DOCUMENTS 62-223855 10/1987 Japan .
62-290282 12/1987 Japan .
2-63350 3/1990 Japan .
2-254674 10/1990 Japan .

OTHER PUBLICATIONS

Patent Abstract of Japan, vol. 12, No. 187, May 31, 1988.
Patent Abstract of Japan, vol. 14, No. 239, May 21, 1990.
French Search Report and Annex.
English Language Abstract of JP 62-223855.
United Kingdom Search Report Corresponding to App. No. 9108585.2.

Primary Examiner—Mark R. Powell
Assistant Examiner—Michael H. Lee
Attorney, Agent, or Firm—Sandler Greenblum & Bernstein

[57] ABSTRACT

A signal demodulation device includes a change point sensing circuit which senses a change point of an envelope of a DPSK signal, and a range setting circuit which generates a gate pulse corresponding to a period in which the DPSK signal cannot be changed. An output signal of the change point sensing circuit and the gate pulse are inputted to an AND gate so that a trigger prohibition signal is obtained. The trigger prohibition signal and the output signal of the change point sensing circuit are inputted to a NOR gate so that a trigger pulse corresponding only to a normal change point of the DPSK signal is generated, so that DPSK modulation data is obtained.

19 Claims, 23 Drawing Sheets

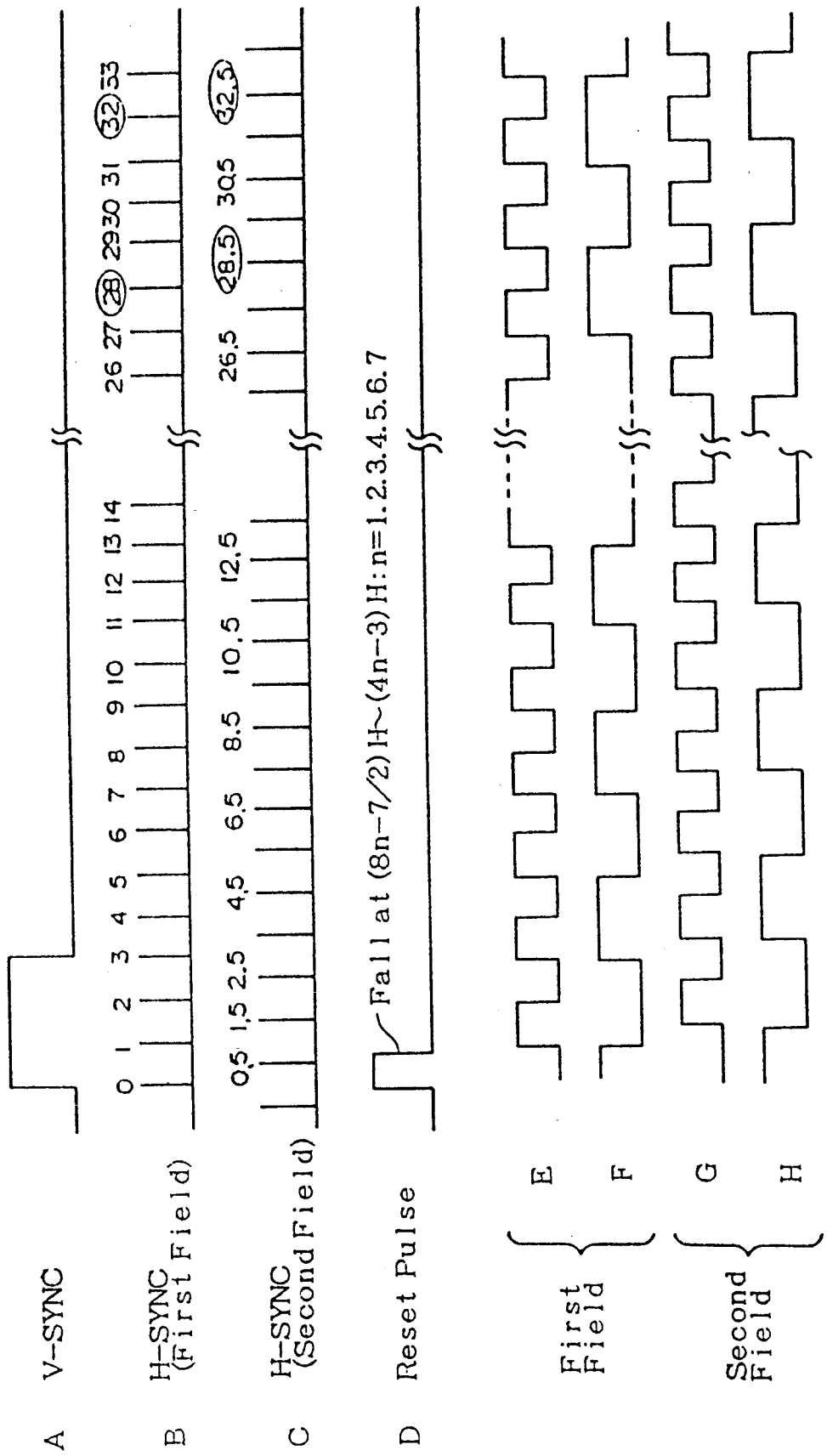

SIGNAL DEMODULATION DEVICE

BACKGROUND OF THE INVENTION

1. Field of the Invention

The present invention relates to a signal demodulation device used in a video floppy disk reproducing device.

2. Description of the Related Art

A typical conventional still video camera has heretofore been arranged such that the image of an object is photoelectrically converted by means of an image pickup device to catch hold of the object image in the form of a luminance signal (Y) and a color signal (C). These signals are combined together by frequency modulation and recorded on a magnetic disk in the form of a multiplex image signal. According to a recent unified standard for still video cameras, a data signal which indicates whether a particular record is a field record or frame record and which also carries other information, for example, an ordinal number of a track on which a particular record has been stored, is recorded on the magnetic disk while being superposed upon the above-described image signal by the frequency multiplexing method.

To modulate the data signal, DPSK (differential phase shift keying) modulation is adopted. Accordingly, the data signal is subjected to DPSK modulation and recorded on the magnetic disk while being superposed upon the image signal. To reproduce the recorded data, the data signal is extracted from the frequency-modulated signal read out from the magnetic disk and subjected to DPSK demodulation after waveform shaping. Various apparatuses for reproducing the data signal have been developed (for example, as disclosed in Japanese Unexamined Patent Publication No. 62-223855).

If a foreign matter, for example, adheres to the magnetic disk, however, a drop out occurs in the DPSK-modulated data signal when a reproducing apparatus reads this data signal, and therefore, an incorrect demodulation might be carried out.

SUMMARY OF THE INVENTION

Therefore, an object of the present invention is to provide a signal demodulation device by which the DPSK signal is correctly demodulated and is not influenced by a drop out in the data signal.

According to the present invention, there is provided a signal demodulation device which obtains a DPSK signal from an input signal and demodulates the DPSK signal, the device comprising a DPSK separation circuit for separating the DPSK signal from the input signal, an envelope detection circuit for detecting an envelope of an output of the DPSK separation circuit, a change point sensing circuit for sensing a change point of an output of the envelope detection circuit, a demodulation data generating circuit for generating demodulation data of the DPSK signal in accordance with an output of the change point sensing circuit, and a processing mechanism for processing an input or an output of the demodulation data generating circuit, to thereby obtain normal demodulation data that is not influenced by a drop out in the DPSK signal.

BRIEF DESCRIPTION OF THE DRAWINGS

The present invention will be better understood from the description of the preferred embodiments of the invention set forth below, together with the accompanying drawings, in which:

FIG. 23 is timing chart showing an operation of the fifth embodiment.

DESCRIPTION OF THE PREFERRED EMBODIMENTS

Figure 1:
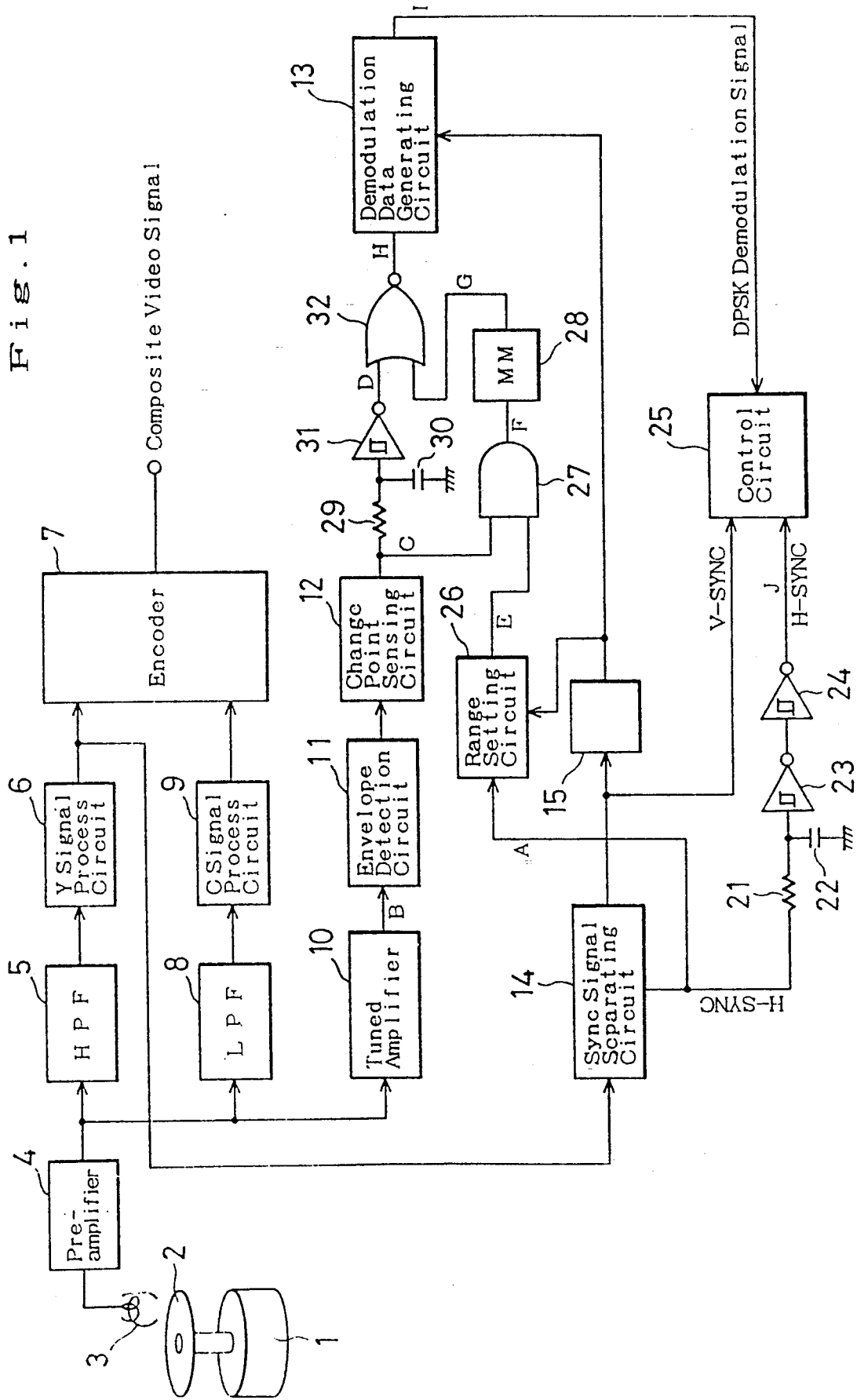
FIG. 1 is a block diagram showing a first embodiment of a signal demodulation device of the present invention.

The present invention will now be described with reference to the embodiments shown in the drawings.

FIG. 1 shows a construction of a first embodiment of a signal demodulation device of the present invention. In this drawing, a floppy disk 2 is rotated by a motor 1. A signal recorded on the disk 2 is reproduced by a magnetic head 3. The reproduced signal outputted by the head 3 is amplified by a preamplifier 4, and then inputted to a high pass filter (HPF) 5, a low pass filter (LPF) 8 and a tuned amplifier 10, respectively.

The high pass filter 5 separates a frequency-modulation (FM) luminance signal from the input signal. The FM luminance signal separated by the high pass filter 5 is inputted to a signal process circuit 6, to be demodulated and processed, and the demodulated luminance signal is then outputted to an encoder 7. Similarly, a FM color signal separated by the low pass filter 8 is inputted to a signal process circuit 9, to be demodulated and processed, and then outputted to the encoder 7. The encoder 7 adds the luminance signal to the color signal to form a composite video signal which is outputted to a not shown circuit.

The tuned amplifier 10 tunes in a frequency component of the DPSK signal in signals inputted thereto, separates the DPSK signal from the other signals, and amplifies the DPSK signal. An output of the tuned amplifier 10 is inputted to an envelope detection circuit 11, so that the envelope of the DPSK signal is detected. An output of the envelope detection circuit 11 is inputted to a change point sensing circuit 12 which senses a change point of the DPSK signal.

The luminance signal or video signal outputted from the signal process circuit 6 is also inputted to a synchronizing signal separating circuit 14, which separates, or obtains, a V-sync (vertical synchronizing signal) and a H-sync (horizontal synchronizing signal) from the luminance signal. The V-sync triggers a mono-multivibrator 15 and is also supplied to a control circuit 25, constructed by a microcomputer, etc. The H-sync is integrated by an integration circuit having a resistor 21 and a capacitor 22, and a waveform of the integrated signal is then shaped by two Schmitt circuits 23 and 24 and supplied to the control circuit 25.

A reset pulse outputted by the mono-multivibrator 15, once at every one field, and an H-sync outputted by the synchronizing signal separating circuit 14, are supplied to a range setting circuit 26, which generates, in accordance with the reset pulse and the H-sync, a signal indicating a predetermined range, and outputs the signal to an input terminal of an AND gate 27. The change point sensing circuit 12 outputs a signal indicating a change point of the DPSK signal to another input terminal of the AND gate 27.

An output of the AND gate 27 triggers a mono-multivibrator 28. An output of the mono-multivibrator 28 is supplied to one input terminal of an NOR gate 32. An output signal of the change point sensing circuit 12 is integrated by an integration circuit composed of a resistor 29 and a capacitor 30, and a waveform of the integrated signal is then shaped by a Schmitt circuit 31 and inputted to another input terminal of the NOR gate 32. An output of the NOR gate 32 is supplied to a demodulation data generating circuit 13, an output of which is supplied to the control circuit 25.

Figure 2:
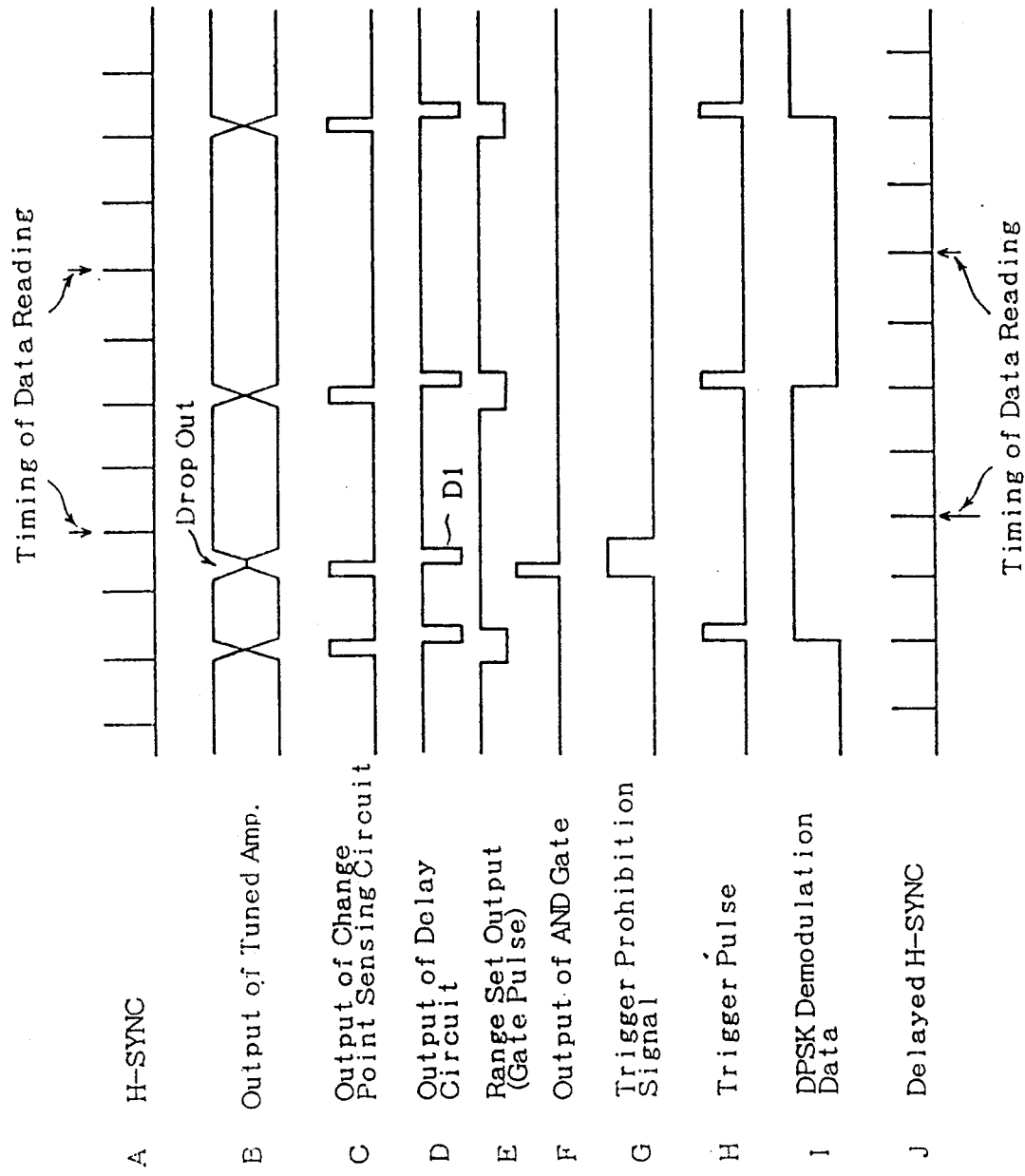
FIG. 2 is timing chart showing an operation of the first embodiment.

An operation of the first embodiment is described below with reference to FIG. 2, which shows a timing chart.

A H-sync signal (A) is outputted from the synchronizing signal separating circuit 14 at a predetermined interval. An output (B) of the tuned amplifier 10 is supplied to the envelope detection circuit 11 and an envelope of the DPSK signal is detected. In this embodiment, it is assumed that a bit defining the DPSK signal is defined by 4H (H means a horizontal scanning period). Therefore, a phase of the DPSK signal can be changed at 4H, as understood from a comparison with the H-sync (A). Accordingly, the envelope of the DPSK signal can also be changed at 4H. The change point of the envelope is sensed by the change point sensing circuit 12, as shown by reference (C) in FIG. 2.

If the drop out exists in the DPSK signal, the change point sensing circuit 12 outputs a pulse signal in the same way as when the change point is sensed.

The output of the change point sensing circuit 12 is delayed by a delay circuit constructed by the resistor 29, the capacitor 30 and the Schmitt circuit 31, and inverted and outputted by the Schmitt circuit 31. This output signal, (D) of the delay circuit, is inputted to the NOR gate 32.

The range setting circuit 26 generates a gate pulse (E) at a timing of 4H by which a phase of the DPSK signal can be changed, based on the reset pulse generated by the mono-multivibrator 15 once at every one field, and the H-sync (A) outputted by the synchronizing signal separating circuit 14. The output signal (C) of the change point sensing circuit 12 and the gate pulse (E) are inputted to the AND gate 27, which passes only the output signal of the change point sensing circuit 12 generated due to the drop out, as shown by the reference (F). The mono-multivibrator 28 is triggered by an output of the AND gate 27, to thereby output a gate signal (G) to the NOR gate 32. This gate signal has a predetermined width and prohibits a triggering of the NOR gate 32.

As a result, the NOR gate 32 does not pass a trigger pulse D1 that is generated due to the drop out. Namely, the trigger pulses (H) correspond only to the change points of the DPSK signal. The demodulation data generating circuit 13 generates DPSK demodulation data (I) in accordance with a signal outputted by the NOR gate 32, i.e., the trigger pulse (H), and outputs the DPSK demodulation data to the control circuit 25.

As described above, the DPSK demodulation signal inputted to the control circuit 25 is delayed by the delay signal composed of the resistor 29, the capacitor 30 and the Schmitt circuit 31. Accordingly, to delay a timing at which this demodulation data is read, the H-sync outputted by the synchronizing signal separating circuit 14 is delayed by a delay circuit composed of the resistance 21, the capacitor 22 and the Schmitt circuit 23, and then inputted to the control circuit 25 as shown by the reference (J). Note, the Schmitt circuit 24 is provided for adjusting a polarity of the H-sync.

Accordingly, the DPSK demodulation data is read by the control circuit during a time at which the DPSK signal or the output (B) of the tuned amplifier 10 is very stable, i.e., the DPSK signal is not changed.

Figure 3:
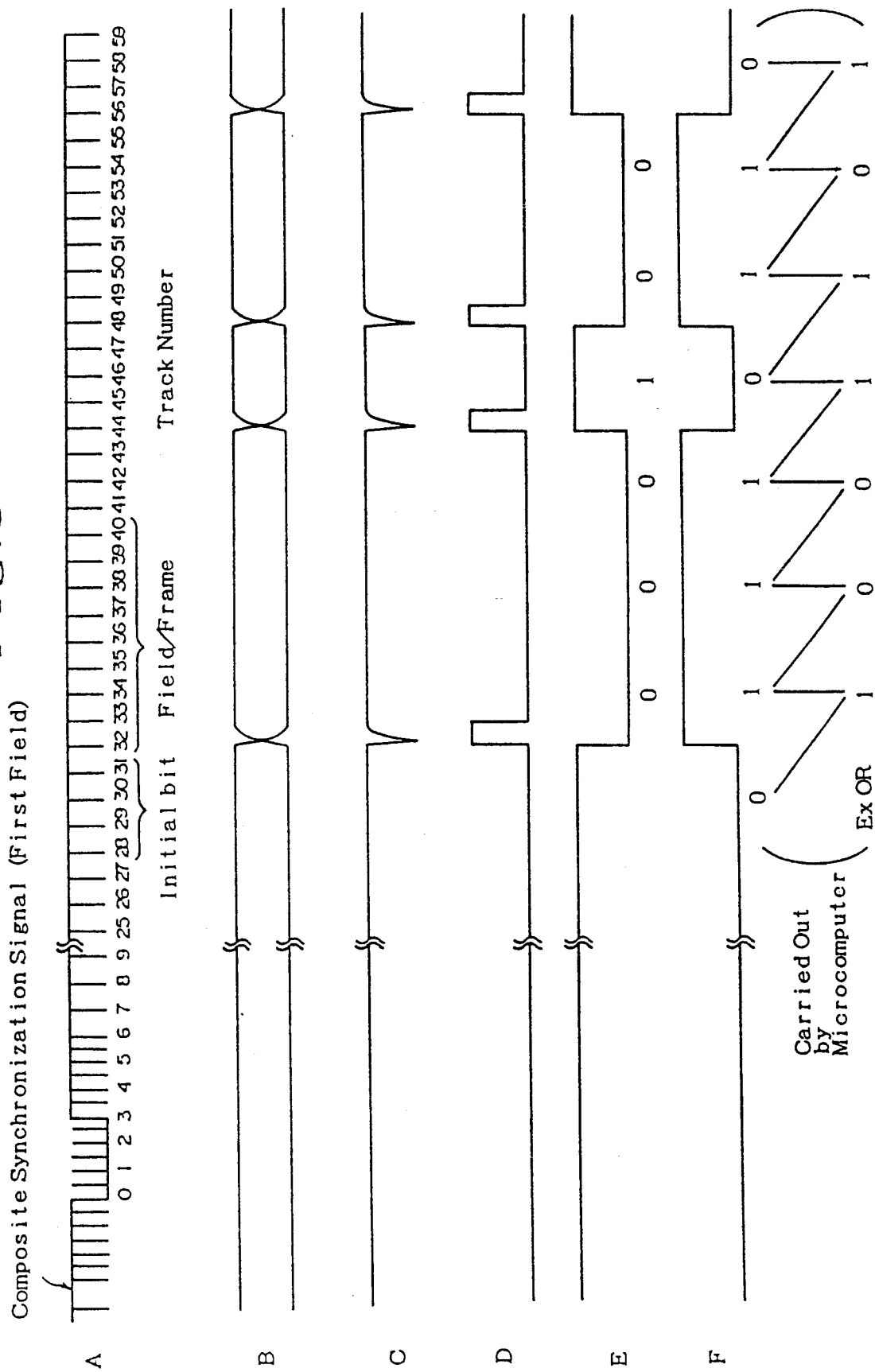
FIG. 3 is timing chart showing an operation for reproducing a DPSK signal.

An operation for reproducing the DPSK demodulation data is described below with reference to FIG. 3.

As shown by the references (A) and (B), the 4H between a 28th H and a 32nd H of a first field of the DPSK signal is an initial bit, and in the following 8H between a 32nd H and a 40th H, a determining signal which denotes a field method or a frame method is allocated. In the following 28H between a 40th H and a 68th H, a track number is allocated. In the example shown in FIG. 3, change points exist at a 32nd H, a 44th H, a 48th H and a 56th H of the DPSK signal (B). These change points are sensed as shown by the refrence (C), and waveforms of the change point signals are shaped as shown by the reference (D). Therefore, in accordance with these change points, signals having a logical level "H" and a logical level "L" which have been reversed are generated as shown by the references (E) and (F). The control circuit 25 calculates an exclusive OR of the sequential two logical levels, and reads the DPSK signal.

A construction of the range setting circuit 26 is described below in more detail.

Figure 4:
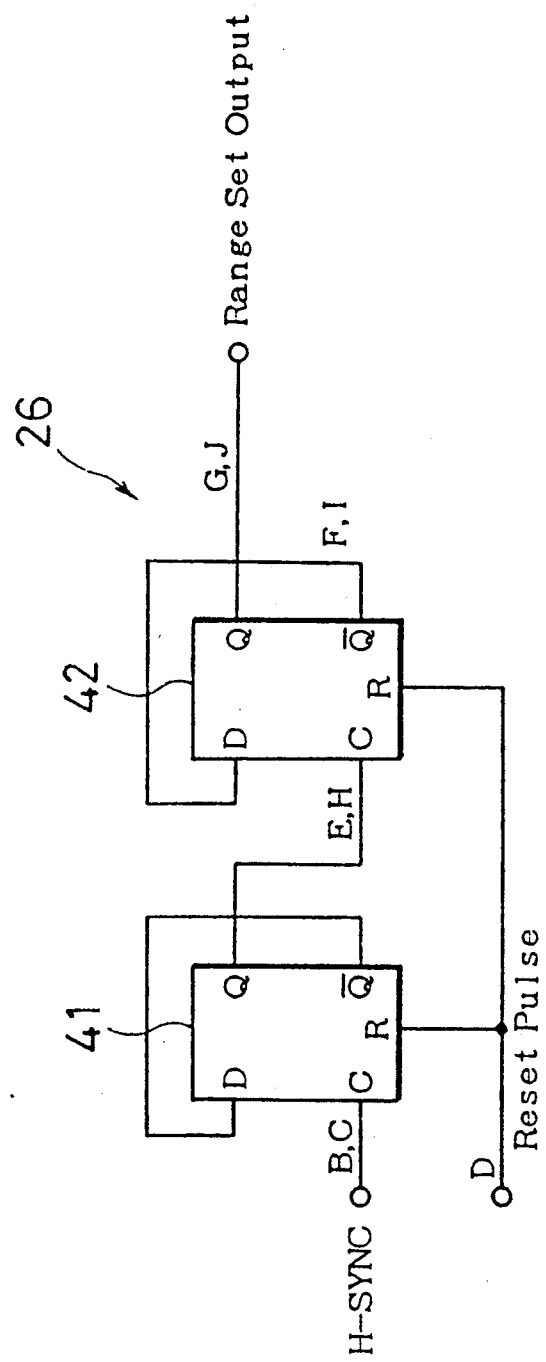
FIG. 4 is a block diagram showing a first example of a range setting circuit.

FIG. 4 shows a construction of a first example of the range setting circuit 26.

The range setting circuit 26 comprises two D flip-flops 41 and 42, which are connected to each other. Each D flip-flops 41 and 42 reverses a polarity of an output signal each time each D flip-flop 41 and 42 is triggered by an input signal.

In the first flip-flop 41, a clock terminal is connected to the synchronizing signal separating circuit 14 and supplied with the H-sync, and a reversed output terminal ($\overline{Q}$) is connected to an input terminal D. An output terminal Q of the first flip-flop 41 is connected to a clock terminal C of the second flip-flop 42. In the second flip-flop 42, a reversed output terminal ($\overline{Q}$) is connected to an input terminal D. An output terminal Q is connected to the AND gate 27. Reset terminals R of the first and second flip-flops 41 and 42 are connected to the mono-multivibrator 15.

Figure 5:
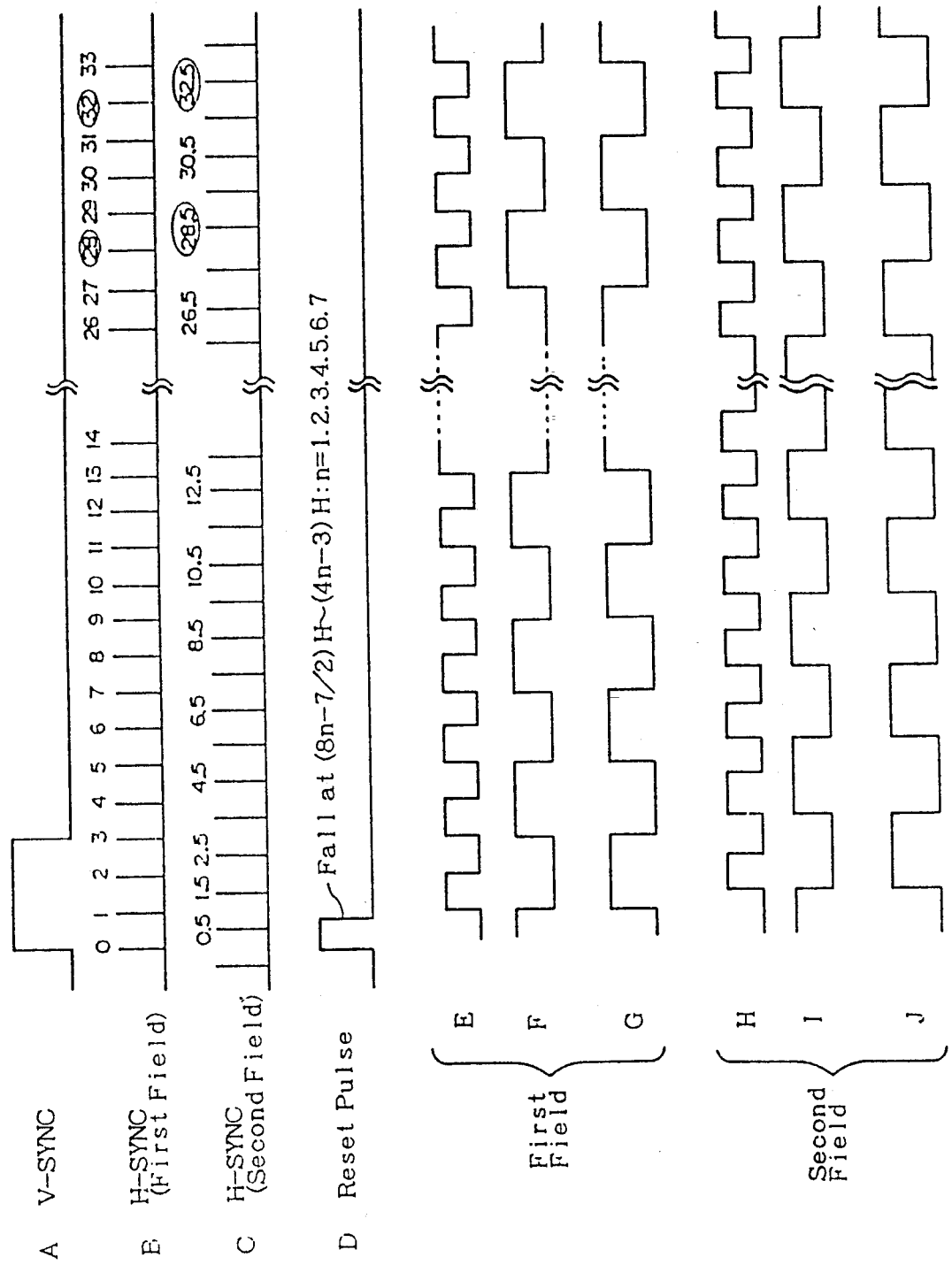
FIG. 5 is a timing chart showing an operation of the range setting circuit shown in FIG. 4.

When the first flip-flop 41 is triggered by an H-sync (an H-sync of a first field as shown by the reference (B) in FIG. 5; an H-sync of a second field as shown by the reference (C) in FIG. 5), the first flip-flop 41 reverses the polarity of the output, as shown by the references (E) and (H) in FIG. 5. Since the second flip-flop 42 is triggered by this output of the first flip-flop 41, the outputs (shown by the references (F), (I), (G) and (J) in FIG. 5) of the second flip-flop 42 have a period of 4H. Thus, a range set output signal (G) and (J), i.e., a gate pulse, is outputted from the range setting circuit 12. The flip-flops 41 and 42 are reset by an output signal (reference (D) in FIG. 5) of the monomultivibrator 15, once at every one field.

Note, in FIG. 5, a numeral encircled by an oval means an H-sync at which the DPSK signal can be changed. Namely, the reset pulse must fall before the 28th H-sync in this example. Further, the reset pulse must fall at $((8n-7)/2)H$ through $(4n-3)H$ wherein "n" can be 1, 2, 3, 4, 5, 6 and 7, so that an H-sync, shown by a numeral which is encircled by an oval in FIG. 5, is outputted while the signals (G) and (J) are "Low", whereby a change point of DPSK signal is detected.

Figure 6:
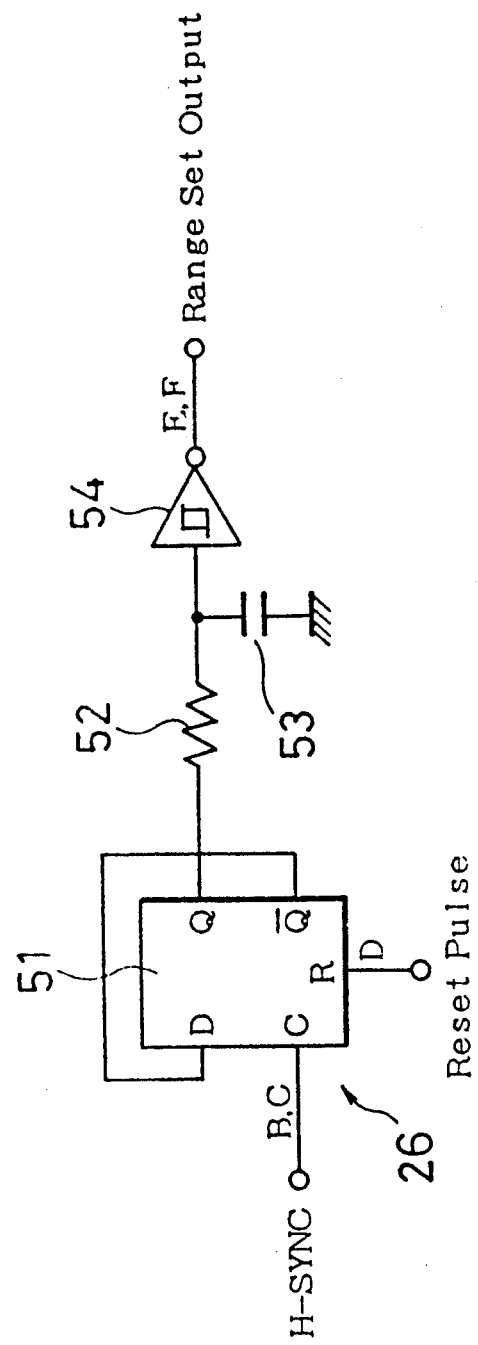
FIG. 6 is a block diagram showing a second example of the range seting circuit.

FIG. 6 shows a construction of a second example of the range setting circuit 26.

This range setting circuit 26 comprises of a D flip-flop 51, an integral circuit which is composed of a resistor 52 and a capacitor 53 and which integrates an output of the flip-flop 51, and a Schmitt circuit 54 which shapes a waveform of an output of the integral circuit. The resistor 52, the capacitor 53 and the Schmitt circuit 54 form a delay circuit.

A clock terminal C is connected to the synchronizing signal separating circuit 14 and supplied with the H-sync, and a reversed output terminal ($\overline{Q}$) is connected to an input terminal D. An output terminal Q of the flip-flop 51 is connected to the resistor 52; an output terminal of the Schmitt circuit 54 is connected to the AND gate 27; and a reset terminal R of the flip-flop 51 is connected to the mono-multivibrator 15.

The polarity of an output of the D flip-flop 51 is reversed each time the D flip-flop is triggered by an output of the synchronizating signal separating circuit 14. Thus, the output of the D flip-flop is delayed by the delay circuit.

Figure 7:
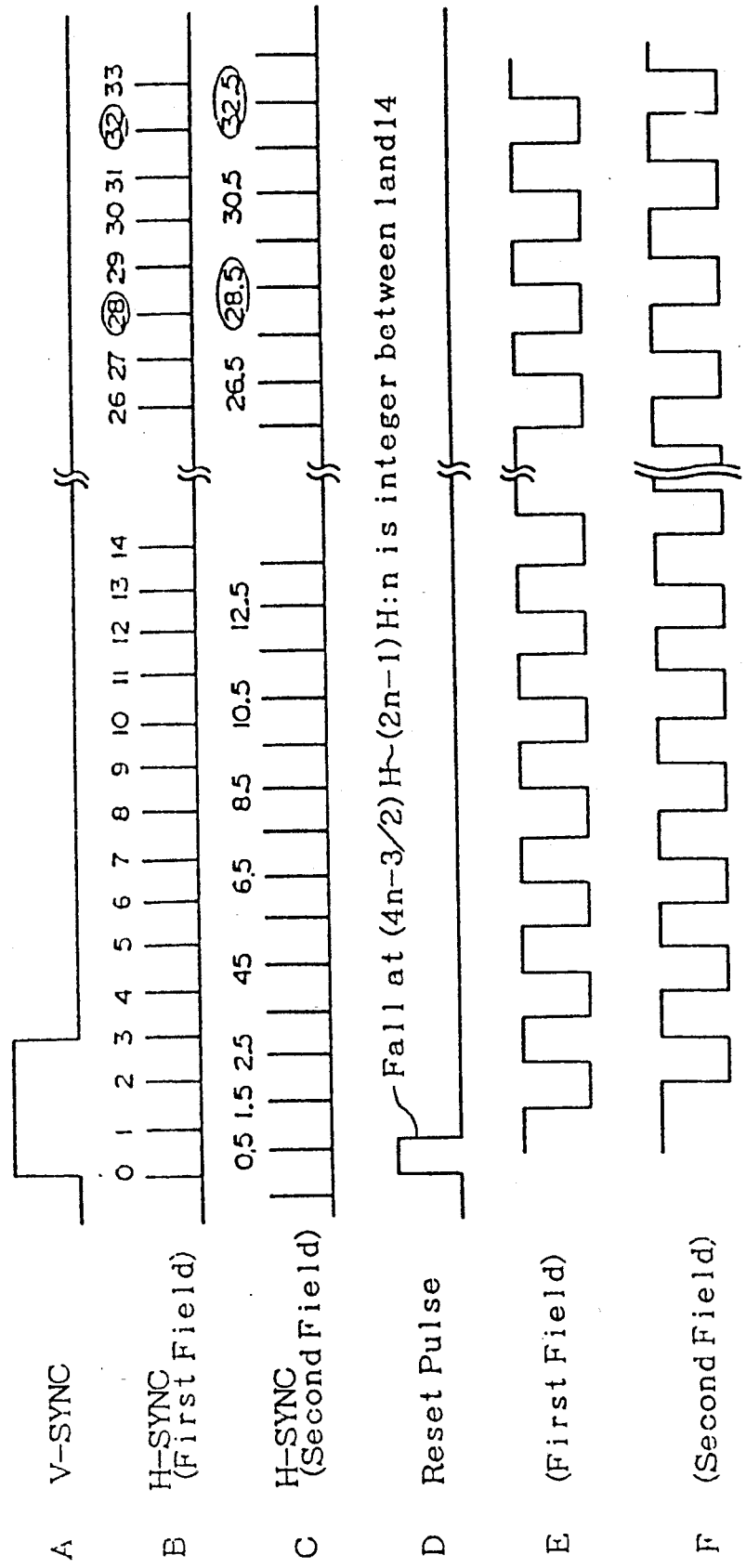
FIG. 7 is a timing chart showing an operation of the range setting circuit shown in FIG. 6.

Since the flip-flop 51 is triggered by a H-sync shown by the references (B) and (C) in FIG. 7, an output of the flip-flop 51 is delayed by the delay circuit. Accordingly, a gate pulse having a 2H width is generated.

Three cases exist in which a phase of the DPSK signal is changed. In the first case, a phase of the DPSK signal is changed at a timing of integer times 4H; in the second case, a phase of the DPSK signal is changed at a timing of an integer times 2H; and in the third case, a period of the change is varied between an integer times 4H and an integer times 2H, in a demodulation. The second example is used when the DPSK signal which can be changed at a timing of an integer times 2H is demodulated.

Figure 8:
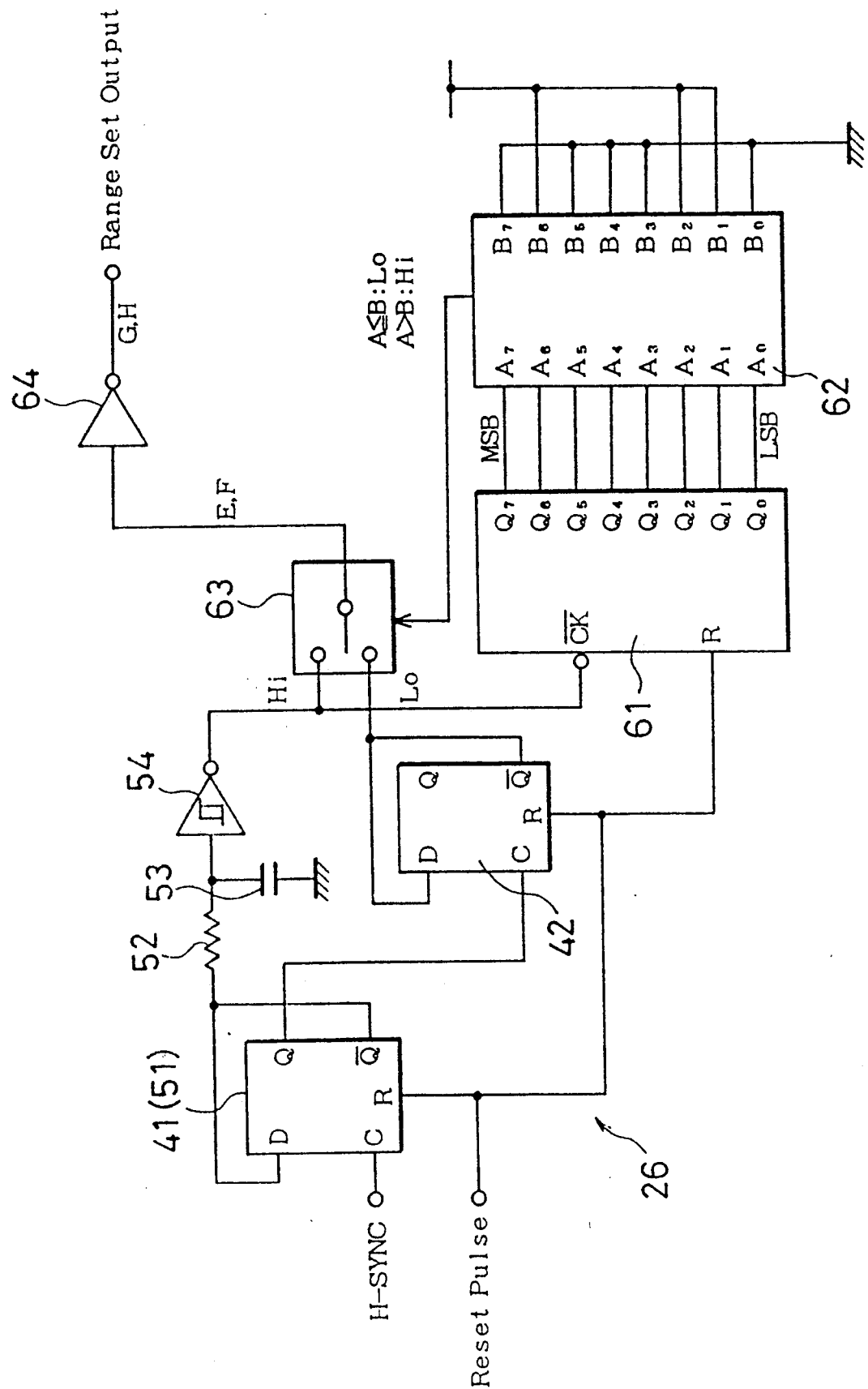
FIG. 8 is a block diagram showing a third example of the range setting circuit.

FIG. 8 shows a construction of a third example of the range setting circuit 26, in which a period of the change of the DPSK signal is changed between an integer times 4H and an integer times 2H, in a demodulating operation.

The construction of this range setting circuit 26 is a combination of that of the first example shown in FIG. 4 and that of the second example shown in FIG. 6.

An output of a first circuit composed of D flip-flops 41(51) and 42 is supplied to one input terminal of a switch 63, and an output of a second circuit composed of the D flip-flop 41(51), a resistor 52, a capacitor 53 and a Schmitt circuit 54 is supplied to the other input terminal of the switch 63, which is controlled in such a manner that one of outputs of the first and second circuits is outputted. A counter 61 and a comparator 62 are provided for switching the switch 63.

The D flip-flop 41(51) is triggered by a H-sync outputted from the synchronizing signal separating circuit 14; the D flip-flop 42 is triggered by an output of the D flip-flop 41(51); and a reversed output terminal of the D flip-flop 41(51) is connected to a delay circuit composed of the resistor 52, the capacitor 53 and the Schmitt circuit 54. The delay circuit is connected to one of input terminals of the switch 63, and an output terminal of the D flip-flop 42 is connected to the other input terminal of the switch 63.

The counter 61 counts an output of the Schmitt circuit 54, and outputs a count value A to the comparator 62, which compares the count value A with a predetermined base value B. Thereafter, when the count value A is smaller than or equal to the base value B, the switch 63 is switched to a lower position in the drawing, and when the count value A is larger than the base value B, the switch 63 is switched to a upper position in the drawing. The output of the switch 63 is outputted to an inverter 64.

Figure 9:
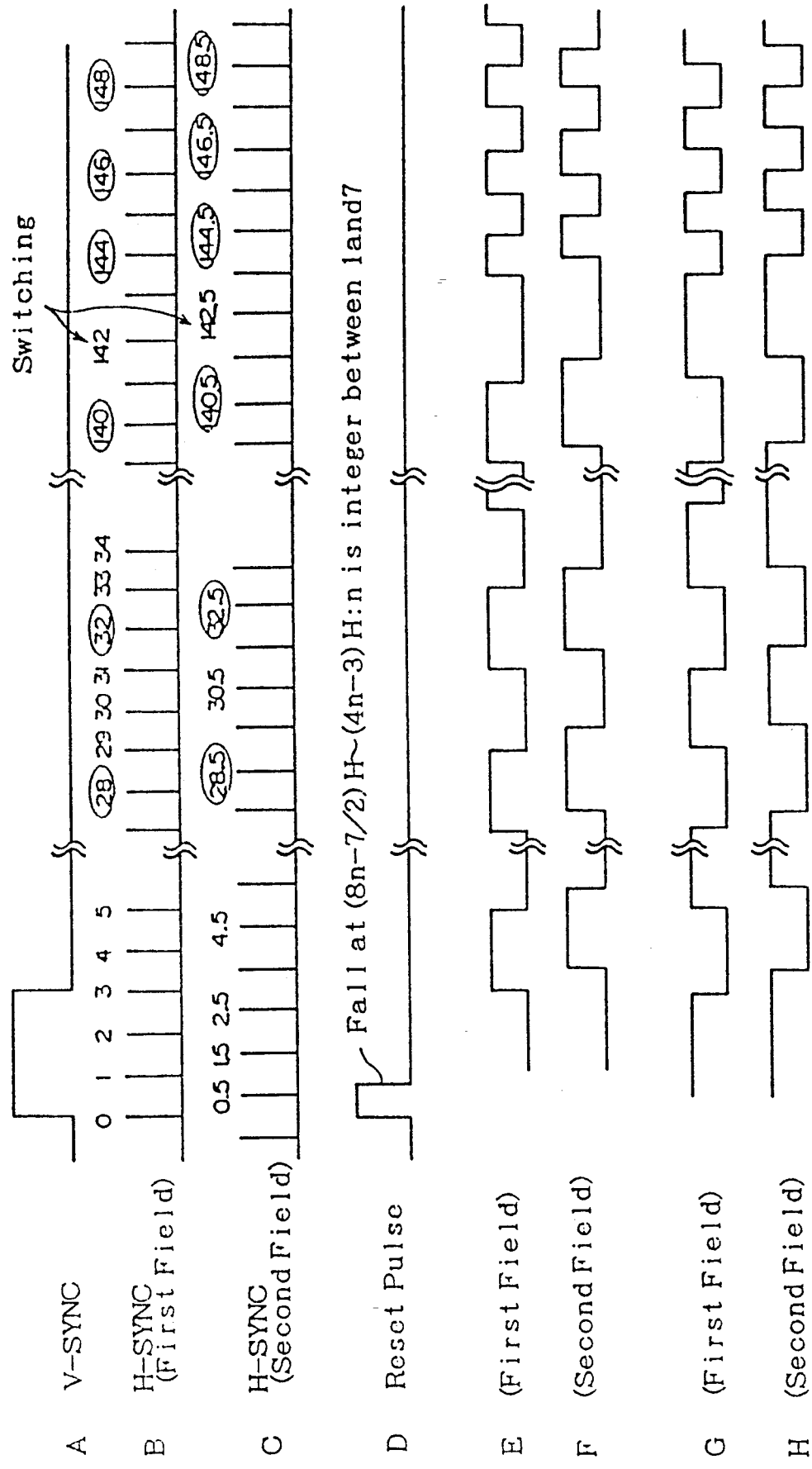
FIG. 9 is a timing chart showing an operation of the range setting circuit shown in FIG. 8.

Accordingly, a period of the gate pulse can be switched between 2H and 4H at a predetermined timing, as shown by the references E,F,G and H in FIG. 9.

Figure 10:
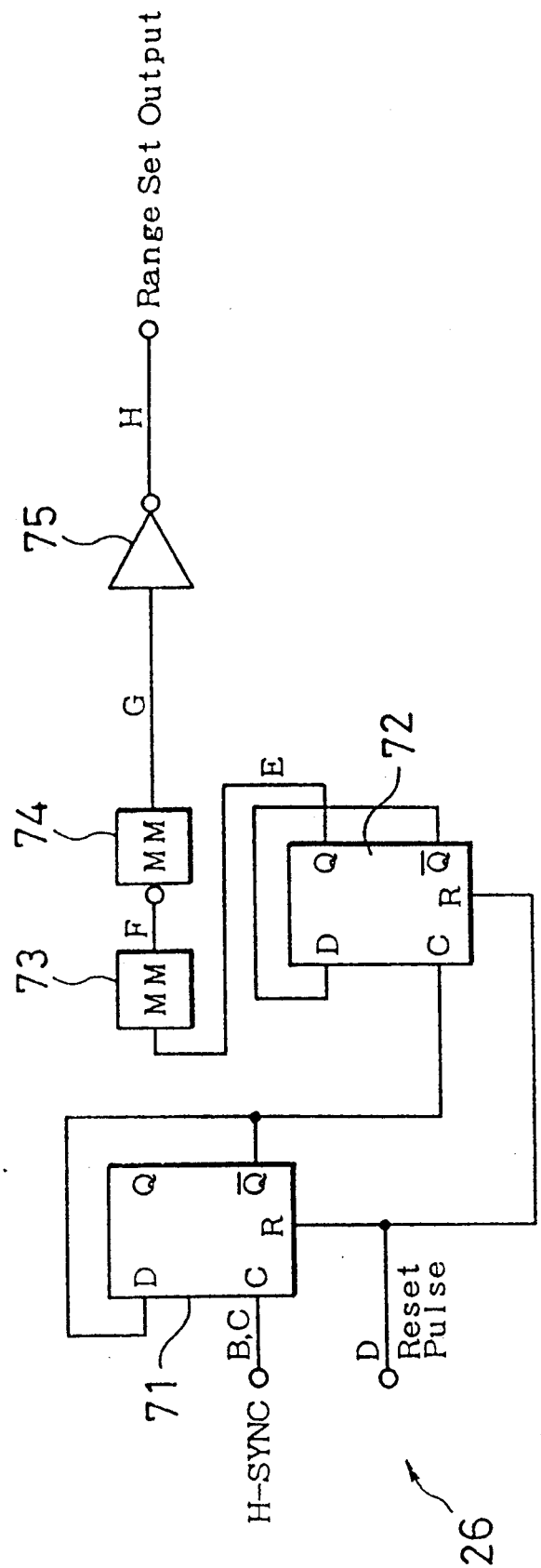
FIG. 10 is a block diagram showing a fourth example of the range setting circuit.

FIG. 10 shows a fourth example of the range setting circuit 26.

Figure 11:
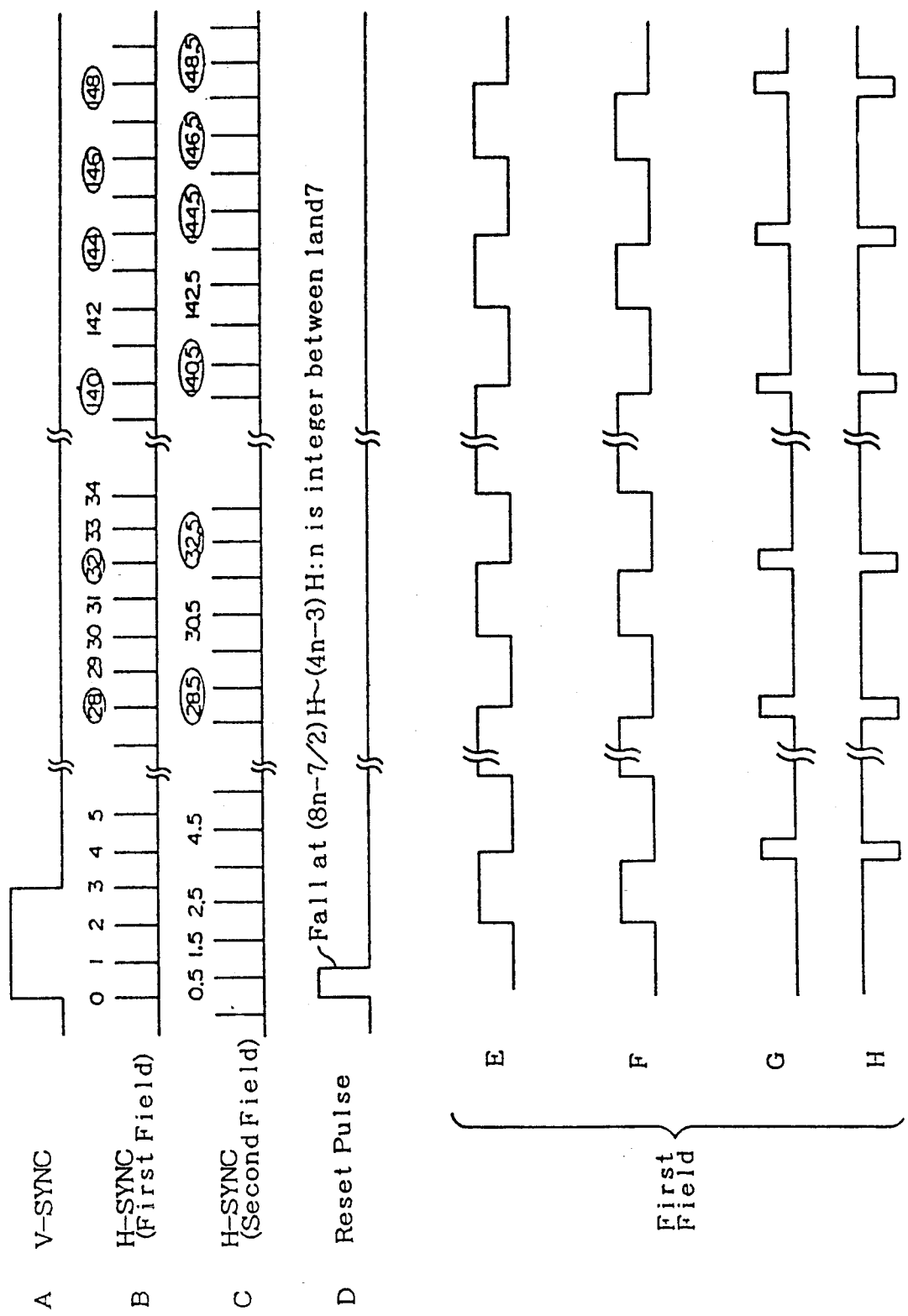
FIG. 11 is a timing chart showing an operation of the range setting circuit shown in FIG. 10.

Range setting circuit 26 comprises a first D flip-flop 71, a second flip-flop 72, a first mono-multivibrator 73, a second mono-multivibrator 74, and an inverter 75. The first D flip-flop 71 is triggered by a H-sync, and the second D flip-flop 72 is triggered by an output of the first D flip-flop 71 and outputs a pulse signal shown by the reference (E) in FIG. 11. The first mono-multivibrator 73 is triggered by the output of the second D flip-flop 72, and outputs a pulse signal shown by the reference (F), which triggers the second mono-multivibrator 74. An output (G) of the second mono-multivibrator 74 is inverted by the inverter 75, so that a range set output signal (H), i.e., a gate pulse, is outputted from the range setting circuit 26.

The gate pulse outputted by this fourth example of the range setting circuit 26 has a 4H period.

Figure 12:
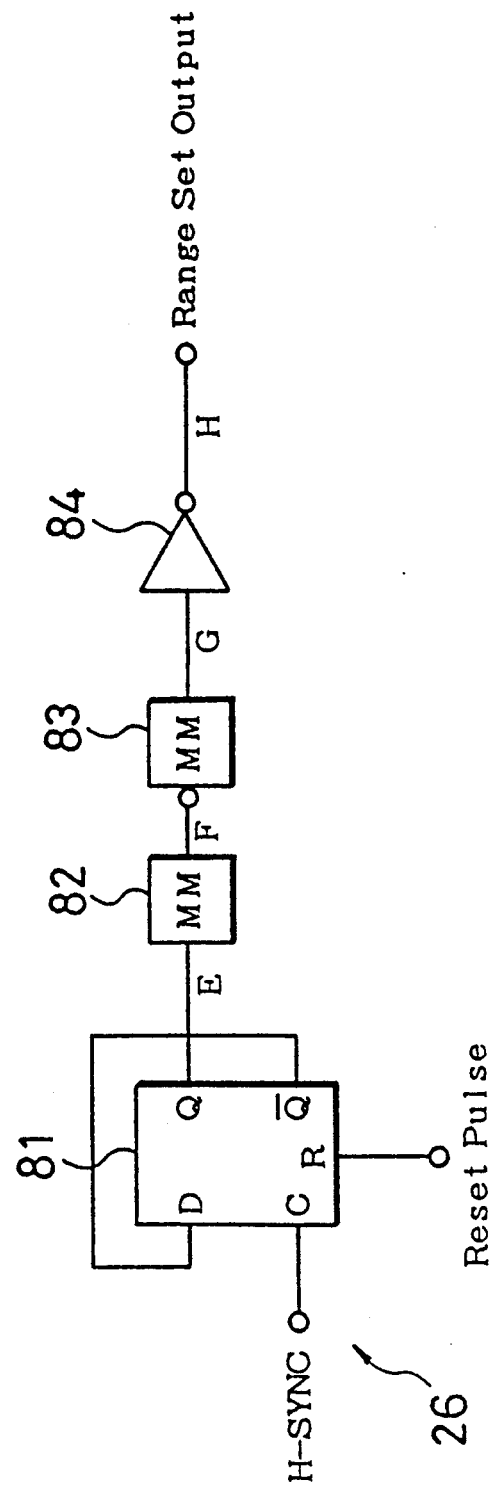
FIG. 12 is a block diagram showing a fifth example of the range setting circuit.

FIG. 12 shows a fifth example of the range setting circuit 26.

Figure 13:
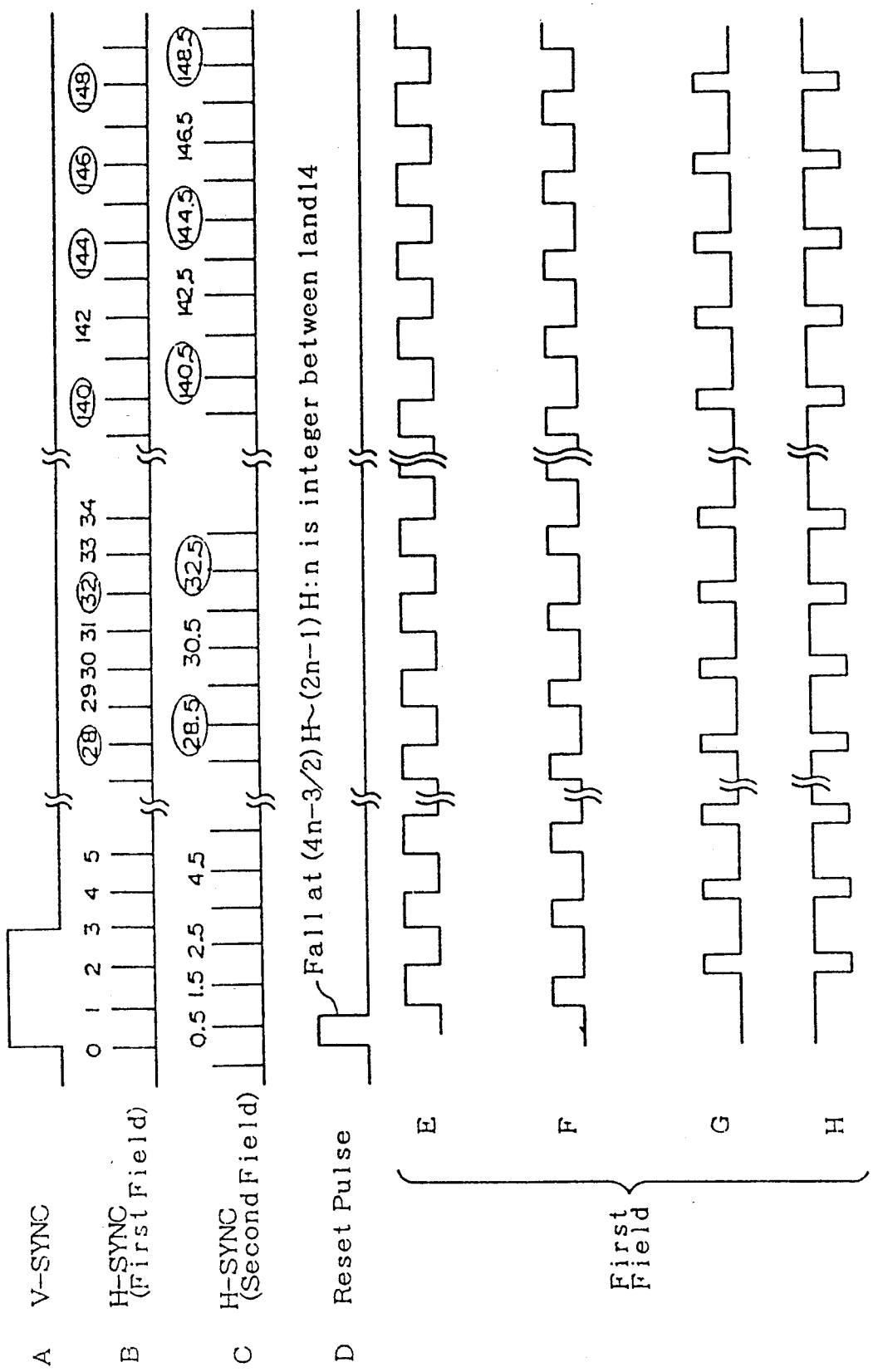
FIG. 13 is a timing chart showing an operation of the range setting circuit shown in FIG. 12.

Range setting circuit 26 comprises a D flip-flop 81, a first mono-multivibrator 82, a second mono-multivibrator 83, and an inverter 84. The D flip-flop 81 is triggered by an H-sync and outputs a pulse signal shown by the reference (E) in FIG. 13. The first mono-multivibrator 82 is triggered by the output of the D flip-flop 81, and outputs a pulse signal shown by the reference (F) which triggers the second mono-multivibrator 83. An output (G) of the second mono-multivibrator 83 is inverted by the inverter 84 so that a range set output signal (H), i.e., a gate pulse, is outputted from the range setting circuit 26.

The gate pulse outputted by this fifth example of the range setting circuit 26 has a 2H period.

Figure 14:
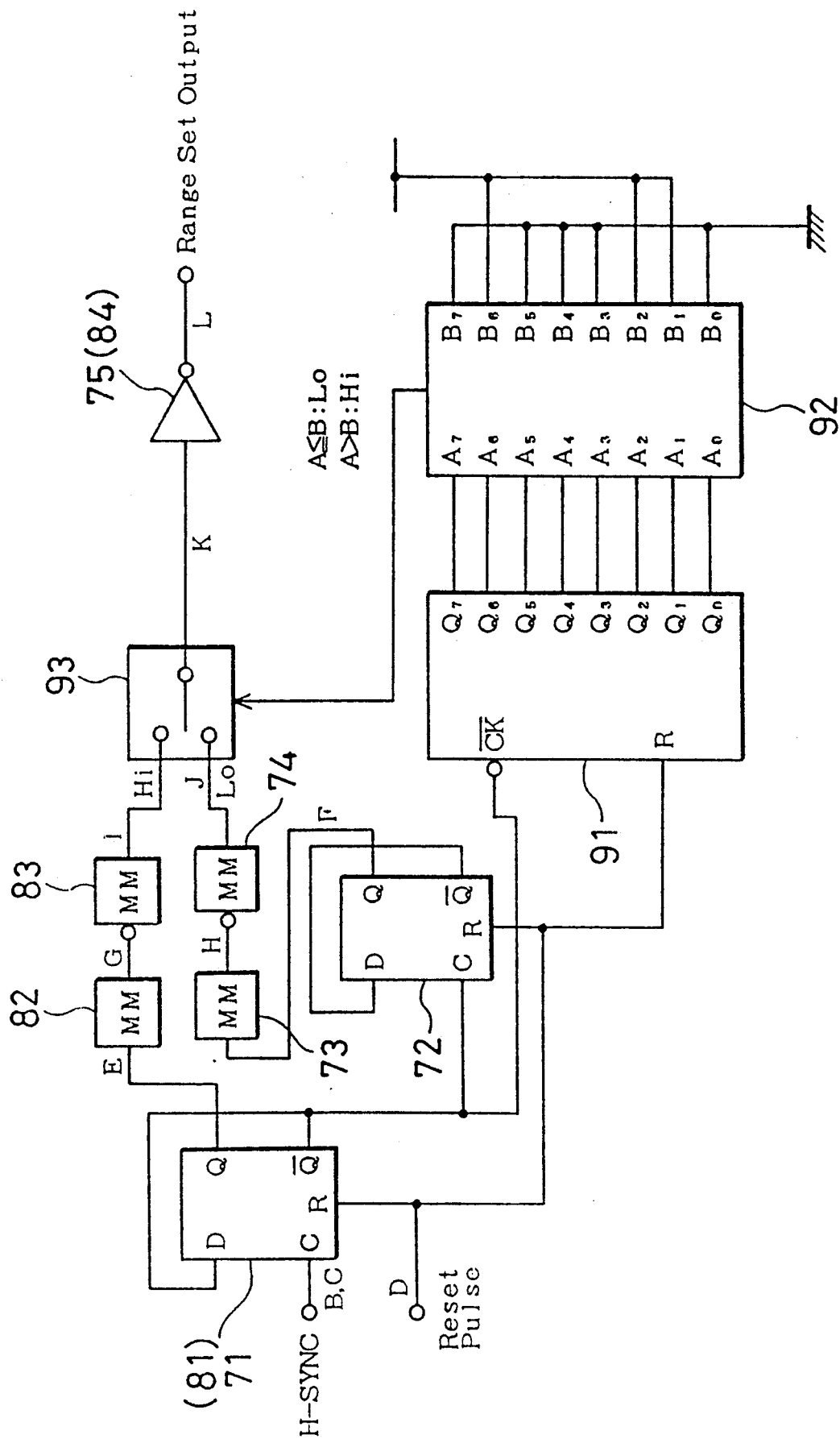
FIG. 14 is a block diagram showing a sixth example of the range setting circuit.

FIG. 14 shows a construction of a sixth example of the range setting circuit 26, in which a period of the change of the DPSK signal is changed between an integer times 4H and an integer times 2H in a demodulating operation.

The construction of this range setting circuit 26 is a combination of that of the fourth example shown in FIG. 10 and that of the fifth example shown in FIG. 12.

Namely, an output of a first circuit composed of a first D flip-flop 71(81), a second D flip-flop 72, a first mono-multivibrator 73, and a second mono-multivibrator 74 is supplied to one input terminal of a switch 83, and an output of a second circuit composed of the first D flip-flop 41(51), a third mono-multivibrator 82, and a fourth mono-multivibrator 83 is supplied to the other input terminal of the switch 83, which is controlled in such a manner that one of outputs of the first and second circuits is outputted. A counter 91 and a comparator 92 are provided for switching the switch 93.

The first D flip-flop 71(81) is triggered by an H-sync outputted from the synchronizing signal separating circuit 14. The second D flip-flop 72 is triggered by an output of the first D flip-flop 71(81). An output terminal of the first D flip-flop 71(81) is connected to the third and fourth mono-multivibrators 82 and 83. Similarly, an output terminal of the second D flip-flop 72 is connected to the first and second mono-multivibrators 73 and 74. The second mono-multivibrator 74 is connected to one of input terminals of the switch 93, and the fourth mono-multivibrator 83 is connected to the other input terminal of the switch 93.

The counter 91 counts an output of the first D flip-flop 71(81), and outputs a count value A to the comparator 92, which compares the count value A with a predetermined base value B. Accordingly, when the count value A is smaller than or equal to the base value B, the switch 93 is switched to a lower position in the drawing, and when the count value A is larger than the base value B, the switch 93 is switched to a upper position in the drawing. An output of the switch 93 is outputted through an inverter 75(84).

Figure 15:
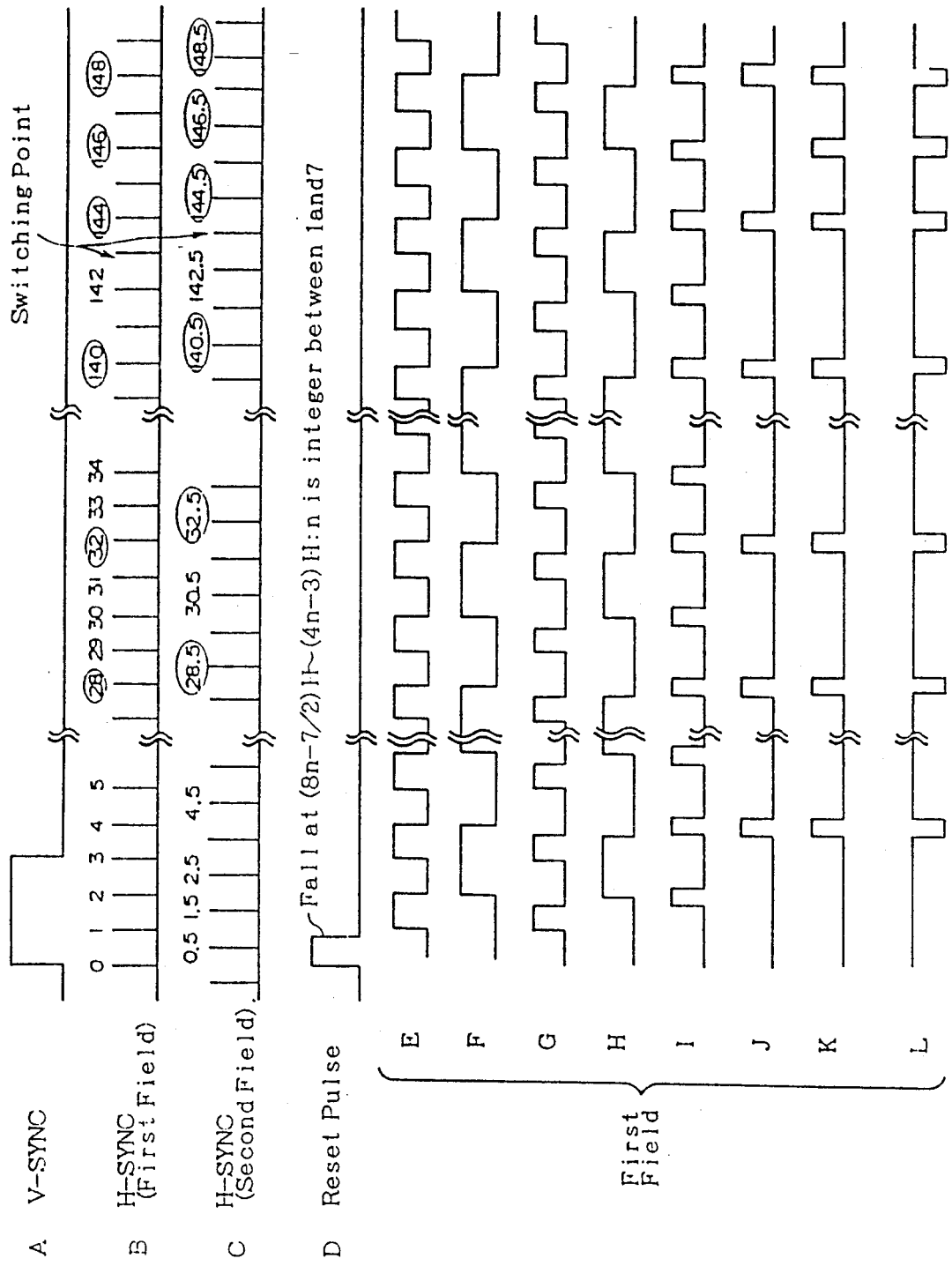
FIG. 15 is a timing chart showing an operation of the range setting circuit shown in FIG. 14.

Therefore, a period of the gate pulse can be switched between 2H and 4H at a predetermined timing, as shown by the reference L in FIG. 15.

As described above, the embodiments shown in FIGS. 1 through 15 are constructed in such a manner that a signal denoting a change point of an envelope of a DPSK signal is not supplied to the demodulation data generating circuit except during a period in which the DPSK-modulated data can be changed. Therefore, when the DPSK signal is demodulated, it is not influenced by the drop out in the DPSK signal. These embodiments are also effective when a change point is intentionally sensed due to noise from outside.

Figure 16:
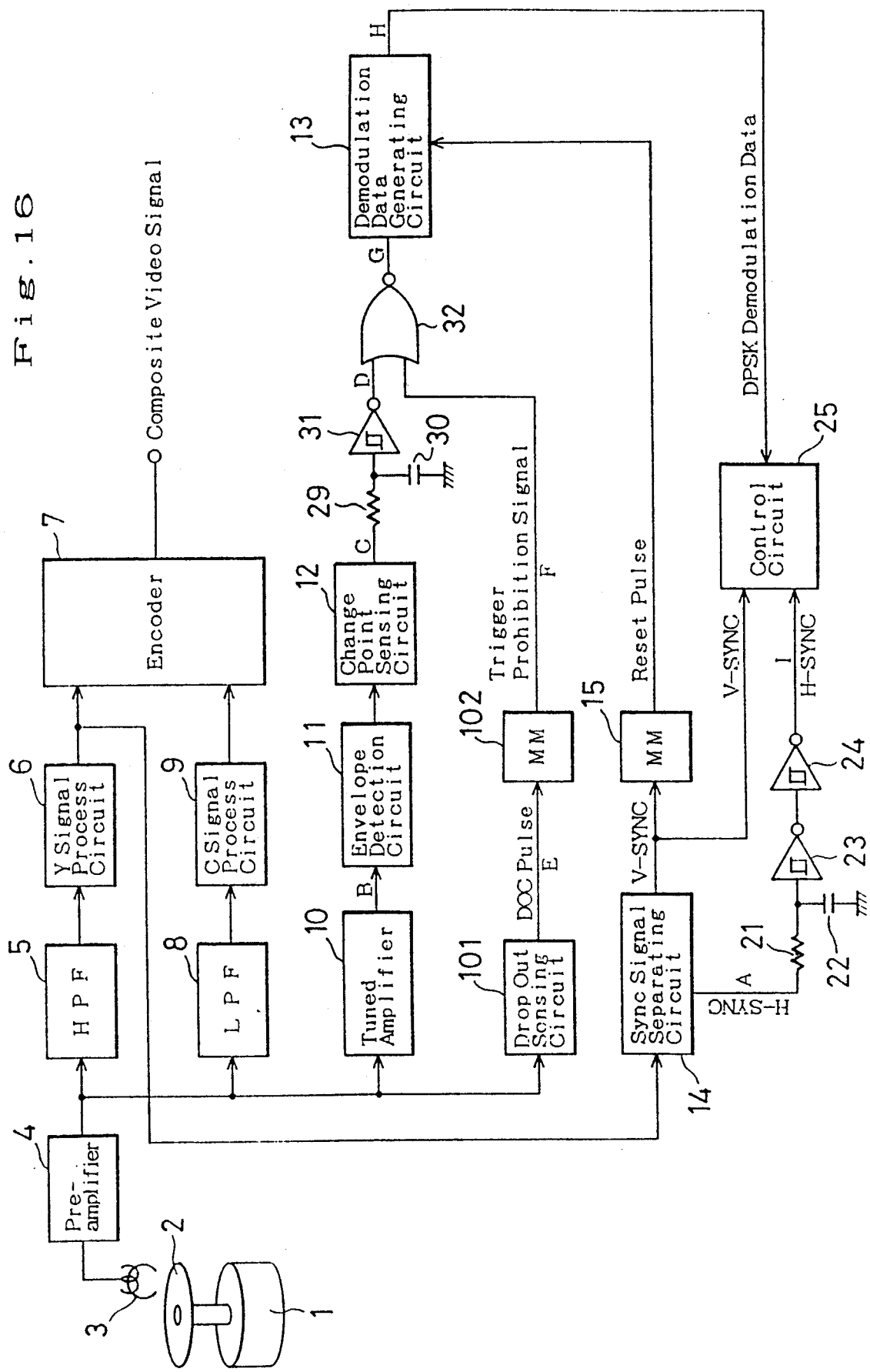
FIG. 16 is a block diagram showing a second embodiment of a signal demodulation device of the present invention.

FIG. 16 shows a construction of a second embodiment of a signal demodulation device of the present invention.

An output of a preamplifier 4 is supplied to a drop out sensing circuit 101, so that a drop out in a signal outputted from the preamplifier 4 is sensed. A mono-multivibrator 102 connected to the drop out sensing circuit 101 is triggered in accordance with an output of the drop out sensing circuit 101, and outputs a gate pulse, which is supplied to an input terminal of a NOR gate 32 or a gate circuit. An output signal of a change point sensing circuit 12 is delayed by a delay circuit comprising resistor 29, capacitor 30 and Schmitt circuit 31. Then, the delayed signal is to another input terminal of the NOR gate 32. An output of the NOR gate 32 is supplied to a demodulation data generating circuit 13, an output of which is supplied to the control circuit 25.

The remaining construction is the same as shown in FIG. 1.

Figure 17:
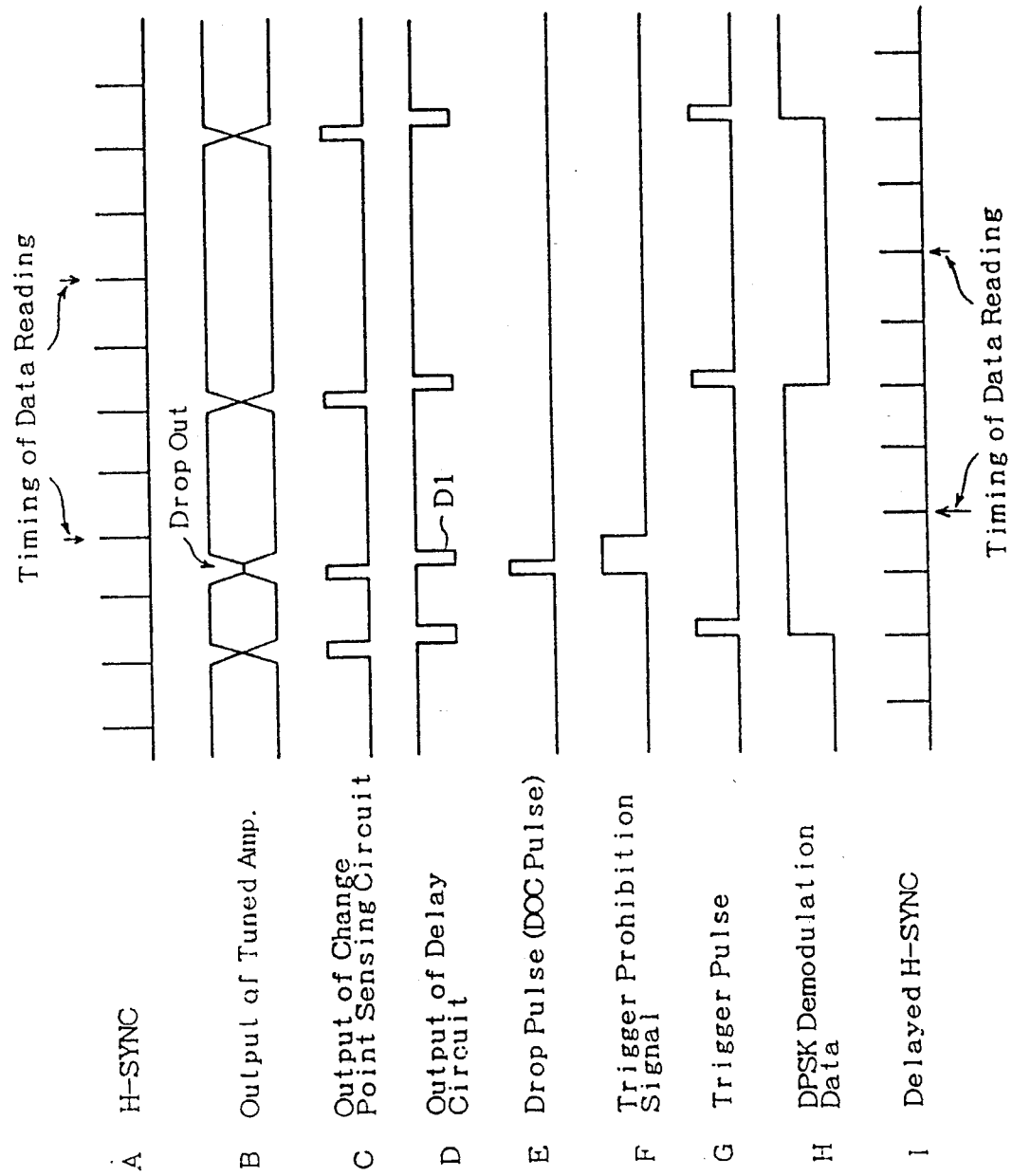
FIG. 17 is timing chart showing an operation of the second embodiment.

An operation of the second embodiment is described below with reference to FIG. 17, showing a timing chart.

A H-sync (A) is outputted from the synchronizing signal separating circuit 14 at a predetermined interval. An output (B) of the tuned amplifier 10 is supplied to the envelope detection circuit 11 and an envelope of the DPSK signal is detected. In this embodiment, it is assumed that a bit defining the DPSK signal is defined by 4H. Therefore, a phase of the DPSK signal can be changed at every 4H. Accordingly, the envelope of the DPSK signal can also be changed at every 4H. This change point of the envelope is sensed by the change point sensing circuit 12 as shown by the reference (C) in FIG. 17. If a drop out exists in the DPSK signal, the change point sensing circuit 12 outputs a pulse signal in the same way as when the change point is sensed.

The output of the change point sensing circuit 12 is delayed by a delay circuit constructed by the resistor 29, the capacitor 30 and the Schmitt circuit 31. The output signal (D) of the delay circuit is inputted to the NOR gate 32.

The drop out sensing circuit 101 senses a drop out in the DPSK signal inputted from the preamplifier 4, and outputs the drop out sensing signal (E) in accordance with the drop out. The mono-multivibrator 102 is triggered in synchronization with the drop out sensing signal, and outputs a trigger prohibition signal (F) to the NOR gate 32.

On the other hand, the output signal (C) of the change point sensing circuit 12 is delayed by the delay circuit composed of resistor 29, capacitor 30 and Schmitt circuit 31, and then inputted to the NOR gate 32 (the reference (D) in FIG. 17).

As a result, the NOR gate 32 does not output a trigger pulse D1, which is generated due to the drop out as shown by the reference (G). The demodulation data generating circuit 13 generates a DPSK demodulation data (H) in accordance with an output signal of the NOR gate 32, i.e. the trigger pulse (H), and outputs the DPSK demodulation data to the control circuit 25.

As in the first embodiment, to delay a timing at which this demodulation data is read, the H-sync outputted by the synchronizing signal separating circuit 14 is delayed by a delay circuit comprising the resistor 21, the capacitor 22 and the Schmitt circuit 23, and then inputted to the control circuit 25 as shown by the reference (I).

The same effect is obtained by this second embodiment as obtained by the first embodiment.

Figure 18:
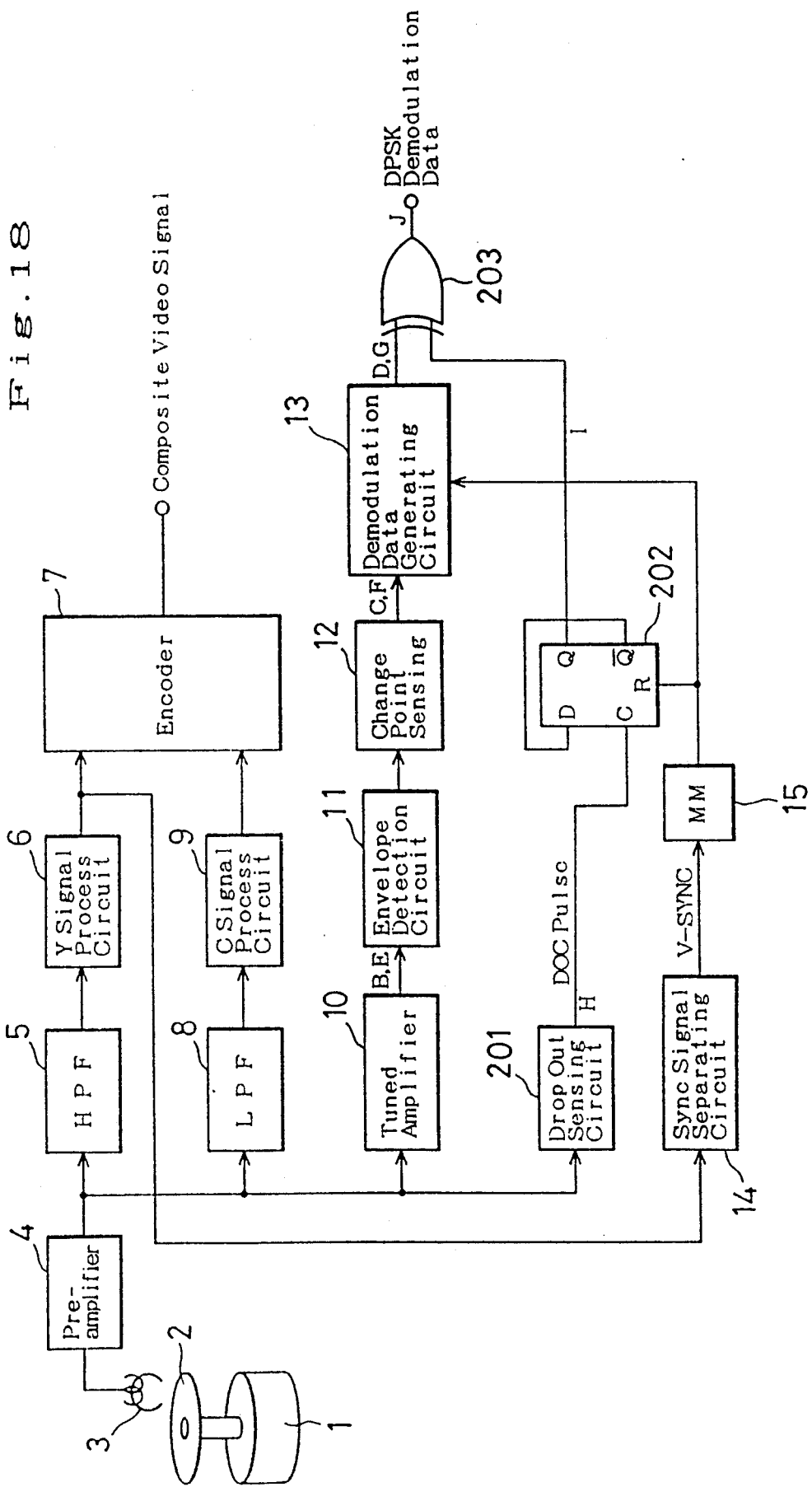
FIG. 18 is a block diagram showing a third embodiment of a signal demodulation device of the present invention.

FIG. 18 shows construction of a third embodiment of a signal demodulation device of the present invention.

In this embodiment, an output of a preamplifier 4 is supplied to drop out sensing circuit 201, so that drop out in signals outputted from the preamplifier 4 is sensed. A D flip-flop 202 is triggered in accordance with an output of the drop out sensing circuit 201. A reversed output terminal ($\overline{Q}$) of the D flip-flop 202 is connected to an input terminal D thereof, and an output terminal Q of the D flip-flop 202 is connected to an input terminal of an exclusive OR 203. Namely, an output of the flip-flop 202 is supplied to the exclusive OR gate 203. An output of a demodulation data generating circuit 13 is also supplied to the exclusive OR gate 203, and the signals outputted by the flip-flop 202 and the demodulation data generating circuit 13 are combined to form one signal. The flip-flop 202 is reset by a reset pulse outputted by a mono-multivibrator 15.

The remaining construction is the same as shown in FIG. 1.

Figure 19:
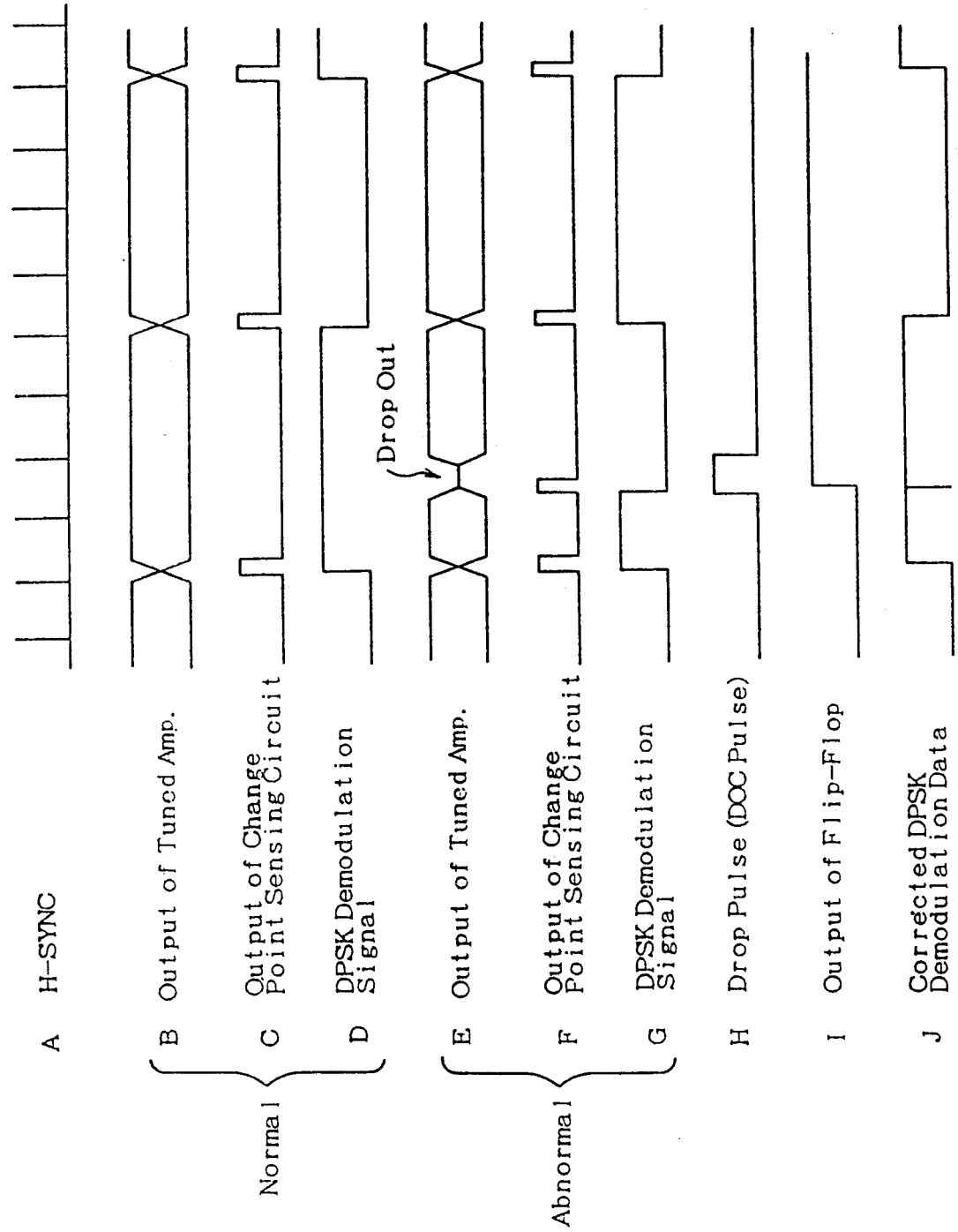
FIG. 19 is timing chart showing an operation of the third embodiment.

An operation of the third embodiment is described below with reference to a timing chart shown in FIG. 19.

The change point sensing circuit 12 outputs a change point (C) when a phase of an output (B) of the tuned amplifier 10 is changed. The output of the change point sensing circuit 12 is inputted to the demodulation data generating circuit 13, so that a demodulation data (D) is generated.

When a drop out occurs in the DPSK signal, as shown by the reference (E), an output of the change point sensing circuit 12 is generated as shown by the reference (F). As a result, abnormal DPSK demodulation data (G) is generated.

When the drop out exists in the DPSK signal inputted from the preamplifier 4, the drop out sensing circuit 201 senses this drop out. When the drop out sensing signal (H) is outputted by the drop out sensing circuit 201, the D flip-flop 202 is triggered, so that the output level of the D flip-flop 202 is reversed. This output (I) of the D flip-flop 202 is correction data, which is combined with an output (G) of the demodulation data generating circuit 13, by the exclusive OR gate 203. Namely, corrected DPSK demodulation data (J) is outputted by the exclusive OR gate 203.

As described above, according to the third embodiment, when a drop out occurs in the DPSK signal, correction data is generated and combined with a demodulated data. Therefore, the DPSK signal is demodulated without influence by the drop out.

Figure 20:
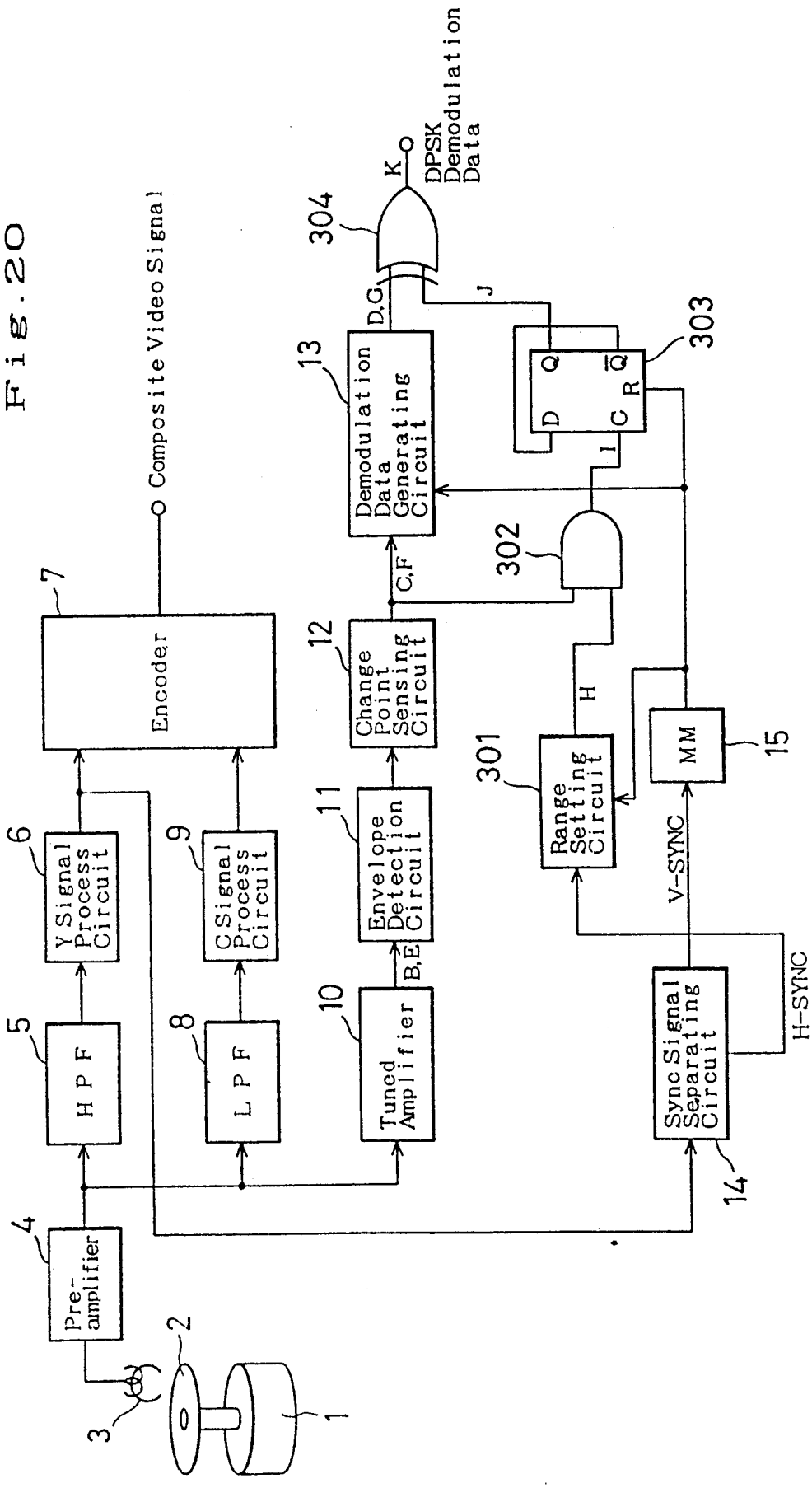
FIG. 20 is a block diagram showing a fourth embodiment of a signal demodulation device of the present invention.
Figure 21:
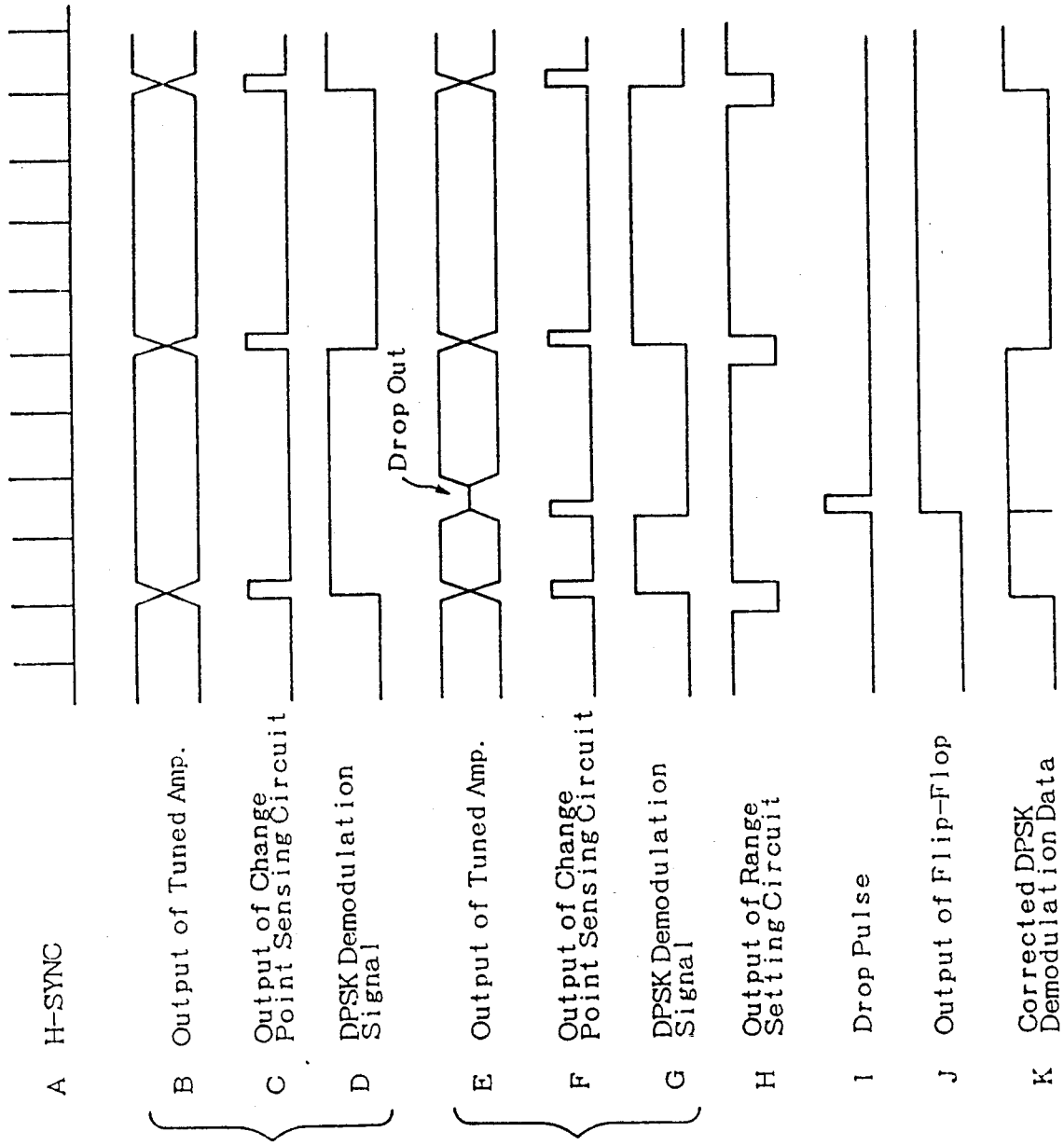
FIG. 21 is timing chart showing an operation of the fourth embodiment.

FIG. 20 shows the construction of a fourth embodiment of a signal demodulation device of the present invention.

In this embodiment, a video signal outputted from a signal process circuit 6 is inputted, not only to an encoder 7, but also to a synchronizing signal separating circuit 14, which separates or obtains a V-sync (vertical synchronizing signal) and an H-sync (horizontal syncronizing signal) from the video signal. The V-sync is supplied to a mono-multivibrator 15, which inputs a reset pulse to a range setting circuit 301. The H-sync is supplied to the range setting circuit 301. In accordance with the reset pulse and the H-sync, the range setting circuit 301 generates a signal indicating a predetermined range, and outputs the signal to an input terminal of and AND gate 302. A change point sensing circuit 12 outputs a signal indicating a change point of a DPSK signal to the other input terminal of the AND gate 302 and to a demodulation data generating circuit 13.

An output of the AND gate 302 triggers a D flip-flop 303, and an output of the D flip-flop 303 is supplied to an input terminal of an exclusive OR gate 304. A signal outputted by the demodulation data generating circuit 13 is inputted to another input terminal of the exclusive OR gate 304. Accordingly, these output signals of the demodulation data generating circuit 13 and the D flip-flop 303 are combined by an exclusive OR gate 304, and the flip-flop 303 is reset by a reset pulse outputted by the mono-multivibrator 15.

The remaining construction is the same as shown in FIG. 1.

An operation of the fourth embodiment is described below with reference to a timing chart shown in FIG. 19.

An H-sync (A) is outputted from the synhronizing signal separating circuit 14 at a predetermined interval. An output (B) of the tuned amplifier 10 is supplied to the envelope detection circuit 11 and an envelope of the DPSK signal is detected. A change point of the envelope is sensed by the change point sensing circuit 12 as shown by the reference (C), and an putput of the change point sensing circuit 12 is inputted to the demodulation data generating circuit 13, whereby DPSK demodulation data (D) is generated.

When a drop out occurs in the DPSK signal, as shown by the reference (E), an output of the change point sensing circuit 12 is generated, as shown by the reference (F). As a result, abnormal DPSK demodulation data (G) is generated.

A gate pulse outputted by the range setting circuit 301 and an output of the change point sensing circuit 12 are inputted to the AND gate 302, which passes only an output generated due to the drop out as shown by the reference (I).

The D flip-flop 303 is triggered by the output of the AND gate 302, to generate correction data (J). This correction data (J) is inputted to the exclusive OR gate 304, and an output (G) of the demodulation data generating circuit 13 and the correction data (J) are combined by the exclusive OR gate 304. As a result, corrected DPSK demodulation data (K) is outputted by the exclusive OR gate 304.

As described above, according to this fourth embodiment, the DPSK signal is demodulated without influence by the drop out.

In the fourth embodiment, as in the first embodiment, the range setting circuit 301 can have the same construction as the range setting circuit 26 shown in FIGS. 4, 6, 8, 10, 12 and 14.

Figure 22:
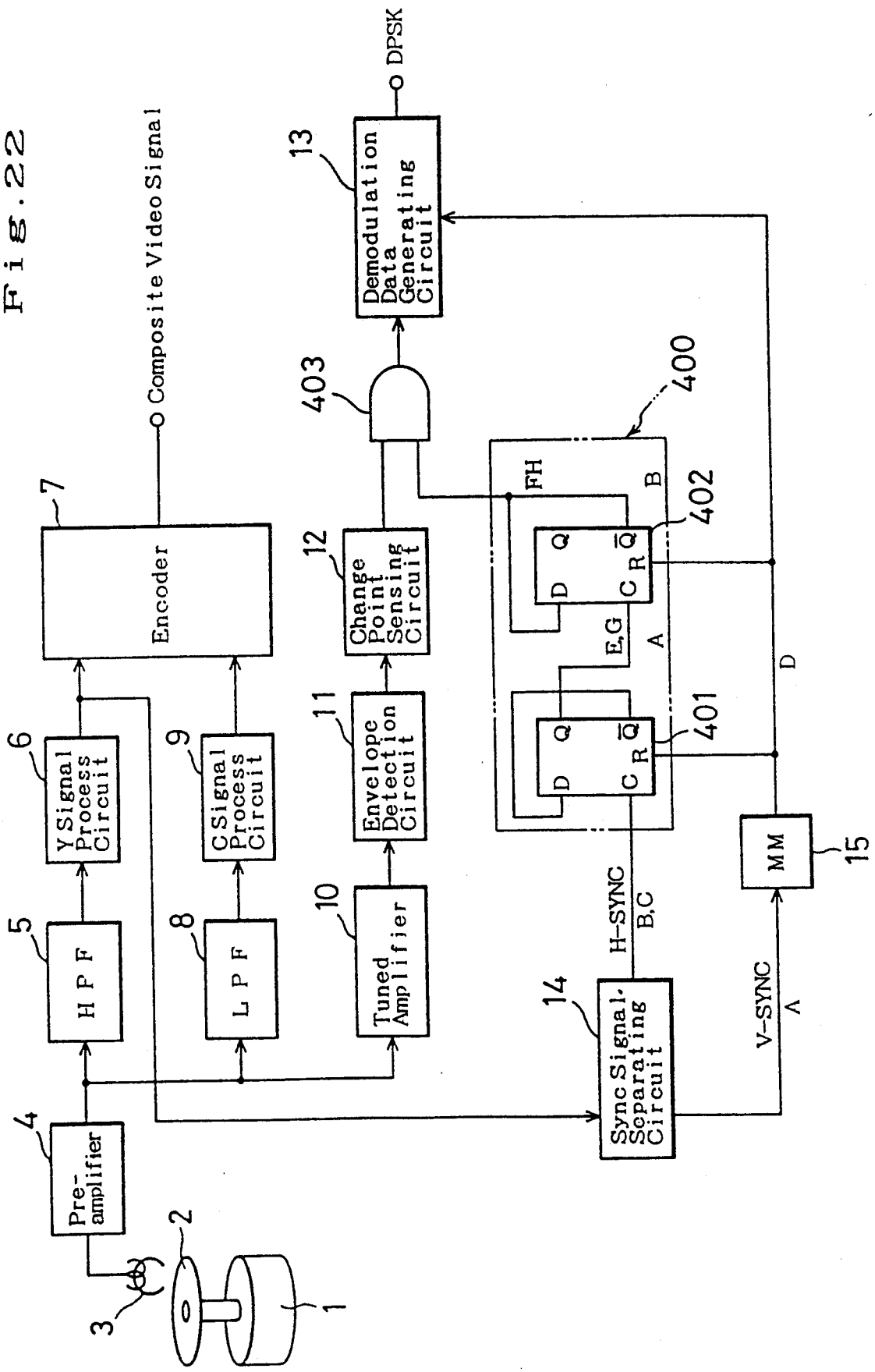
FIG. 22 is a block diagram showing a fifth embodiment of a signal demodulation device of the present invention.

FIG. 22 shows a the construction of a fifth embodiment of a signal demodulation device of the present invention.

In this embodiment, as in the fourth embodiment, a synchronizing signal separating circuit 14 outputs a V-sync to a mono-multivibrator 15 and an H-sync to a gate pulse generating circuit 400, which has a first D flip-flop 401 and a second D flip-flop 402. The mono-multivibrator 15 outputs reset pulses to the first and the second D flip-flops 401 and 402, respectively. The first D flip-flop 401 is triggered by the synchronizing signal separating circuit 14, and the second D flip-flop 402 is triggered by the first D flip-flop 401. An output of the second D flip-flop 402 is supplied to one of input terminals of an AND gate 403, another input terminal of which is supplied with a signal outputted from the change point sensing circuit 12. An output signal of the AND gate 403 is supplied to a demodulation data generating circuit 13.

The remaining construction is the same as shown in FIG. 1.

An operation of the fifth embodiment is described below with reference to FIG. 23.

A V-sync (A) is outputted from the mono-multivibrator 15 to output a reset pulse (D). A H-sync (B) and (C) are outputted from the synchronizing signal separating circuit 14 at a predetermined interval, so that the first D flip-flop 401 is triggered. As a result, an output of the first D flip-flop 401 is reversed at each 1H. Thus, the first D flip-flop 401 outputs a signal having a 2H period, as shown by the references (E) and (G). The second D flip-flop 402 is triggered by the first D flip-flop 401, to output a signal having a 4H period as shown by the references (F) and (H).

Since a gate pulse outputted by the second D flip-flop 402 is inputted to the AND gate 403, AND gate 403 passes only a signal generated at a regular timing by the change point sensing circuit 12, whereby a signal is generated at a timing other than the regular timing due to, for example, the drop out. As a result, the demodulation data generating circuit 13 generates a demodulated DPSK signal without influence by the drop out.

In the fifth embodiment, as in the first embodiment, the gate pulse generating circuit 400 can have the same construction as the range setting circuit 26 shown in FIGS. 6, 8, 10, 12 and 14, except that the inverters 54, 64, 75 and 84 are omitted in the gate pulse generating circuit 400.

Since the fifth embodiment is constructed in such a manner that the gate pulse is generated so that only a change point sensing signal generating at a normal timing is selected, the DPSK signal can be demodulated without influence by the drop out in the DPSK signal.

Although the embodiments of the present invention have been described herein with reference to the accompanying drawings, obviously many modifications and changes may be made by those skilled in this art without departing from the scope of the invention.

The present disclosure relates to subject matter contained in Japanese patent application Nos. 2-105602, 2-105603, 2-105604, 2-105605 and 2-105606 (all filed on Apr. 20, 1990) which are expressly incorporated herein by reference in their entirety.

I claim:

1. A signal demodulation device which obtains a differential phase shift keying (DPSK) signal from an input signal and demodulates said DPSK signal, comprising:
    a DPSK separation circuit for separating said DPSK signal from said input signal;
    an envelope detection circuit for detecting an envelope of an output of said DPSK separation circuit;
    a change point sensing circuit for sensing a change point of an output of said envelope detection circuit;
    a demodulation data generating circuit for generating demodulation data of said DPSK signal in accordance with an output of said change point sensing circuit; and
    means for processing a signal of said demodulation data generating circuit to obtain normal demodulation data not influenced by a drop out in said DPSK signal.

2. A signal demodulation device according to claim 1, wherein said processing means comprises
    a video signal separation circuit for separating a video signal from said input signal;
    a synchronization signal separation circuit for separating a synchronization signal from an output of said video signal separation circuit;
    a range setting circuit for generating, in synchronization with an output of said synchronization signal separation circuit, a gate signal indicating a predetermined range; and
    a gate circuit for controlling a supply of an output of said change point sensing circuit to said demodulation data generating circuit, in accordance with an output of said range setting circuit.

3. A signal demodulation device according to claim 2, wherein said range setting circuit generates said gate signal at a timing by which a phase of the DPSK signal can be changed.

4. A signal demodulation device according to claim 2, wherein said range setting circuit has a first D flip-flop, a polarity of an output of said first D flip-flop being reversed each time said first D flip-flop is triggered by the synchronization signal.

5. A signal demodulation device according to claim 4, wherein said range setting circuit further comprises a second D flip-flop triggered by an output of said first D flip-flop.

6. A signal demodulation device according to claim 5, wherein said range setting circuit further comprises a first mono-multivibrator triggered by an output of said second flip-flop, and a second mono-multivibrator triggered by an output of said first mono-multivibrator.

7. A signal demodulation device according to claim 4, wherein said range setting circuit further comprises a delay circuit, an output of said first D flip-flop being delayed by said delay circuit.

8. A signal demodulation device according to claim 4, wherein said range setting circuit further comprises a first mono-multivibrator that is triggered by an output of said second flip-flop, and a second mono-multivibrator that is triggered by an output of said first mono-multivibrator.

9. A signal demodulation device according to claim 2, wherein said range setting circuit comprises a first D flip-flop that is triggered by said synchronization signal, a second D flip-flop that is triggered by an output of said first D flip-flop, a delay circuit that is connected to an output terminal of said first D flip-flop, and a switch that is controlled in such a manner that an output of said delay circuit and said second D flip-flop is outputted from said range setting circuit.

10. A signal demodulation device according to claim 2, wherein said range setting circuit comprises a first D flip-flop that is triggered by said synchronization signal, a second D flip-flop that is triggered by an output of said first D flip-flop, a first mono-multivibrator that is connected to an output terminal of said second D flip-flop, a second mono-multivibrator that is connected to said first mono-multivibrator, a third mono-multivibrator that is connected to an output terminal of said first D flip-flop, a fourth mono-multivibrator that is connected to said third mono-multivibrator, and a switch that is controlled in such a manner that an output of said second mono-multivibrator and said fourth mono-multivibrator is outputted from said range setting circuit.

11. A signal demodulation device according to claim 1, wherein said processing means comprises:
- a drop out sensing circuit for sensing a drop out of said DPSK signal; and
- a gate circuit for controlling a supply of an output of said change point sensing circuit to said demodulation data generating circuit, in accordance with an output of said drop out sensing circuit.

12. A signal demodulation device according to claim 1, wherein said processing means comprises:
- a drop out sensing circuit for sensing a drop out of said DPSK signal;
- a correction data generating circuit for generating correction data in accordance with an output of said drop out sensing circuit, and
- a combination circuit for combining an output of said demodulation data generating circuit and an output of said correction data generating circuit.

13. A signal demodulation device according to claim 12, wherein said correction data generating circuit comprises a D flip-flop that is triggered by an output of said drop out sensing circuit.

14. A signal demodulation device according to claim 1, wherein said processing means comprises:
- a video signal separation circuit for separating a video signal from said input signal;
- a synchronization signal separation circuit for separating a synchronization signal from an output of said video signal separation circuit;
- a range setting circuit for generating a gate signal indicating a predetermined range in synchronization with an output of said synchronization signal separation circuit;
- a gate circuit for sensing an abnormal change point in accordance with an output of said change point sensing circuit and an output of said range setting circuit;
- a correction data generating circuit for generating correction data in accordance with an output of said gate circuit; and
- a combination circuit for combining an output of said demodulation data generating circuit and an output of said correction data generating circuit.

15. A signal demodulation device according to claim 14, wherein said gate circuit comprises an AND gate that is supplied with output signals from said change point sensing circuit and said range setting circuit.

16. A signal demodulation device according to claim 14, wherein said correction data generating circuit comprises a D flip-flop that is triggered by said gate circuit.

17. A signal demodulation device according to claim 14, wherein said combination circuit comprises an exclusive OR gate that is supplied with output signals from said correction data generating circuit and said demodulation data generating circuit.

18. A signal demodulation device according to claim 1, wherein said processing means comprises:
- a video signal separation circuit for separating a video signal from said input signal;
- a synchronization signal separation circuit for separating a synchronization signal from an output of said video signal separation circuit;
- a gate pulse generating circuit for generating a gate pulse in synchronization with an output of said synchronization signal separation circuit; and
- a gate circuit for controlling an output of said change point sensing circuit due to an output of said gate pulse generating circuit, so as to supply only a normal change point to said demodulation data generating circuit.

19. A signal demodulation device which obtains a differential phase shift keying (DPSK) signal from an input signal and demodulates said DPSK signal, said device comprising:
- a DPSK separation circuit for separating said DPSK signal from said input signal;
- an envelope detection circuit for detecting an envelope of an output of said DPSK separation circuit;
- a change point sensing circuit for sensing a change point of an output of said envelope detection circuit;
- a demodulation data generating circuit for generating demodulation data of said DPSK signal in accordance with an output of said change point sensing circuit;
- means for determining a timing at which said DPSK signal should be changed; and
- means for processing a signal of said demodulation data generating circuit to obtain normal demodulation data not influenced by drop out in said DPSK signal, in accordance with said timing determined by said timing means.

* * * * *

UNITED STATES PATENT AND TRADEMARK OFFICE
CERTIFICATE OF CORRECTION

PATENT NO. : 5,287,197
DATED : February 15, 1994
INVENTOR(S) : Koichi SATO

It is certified that error appears in the above-indentified patent and that said Letters Patent is hereby corrected as shown below:

On the cover, in section [56], "References Cited", under "FOREIGN PATENT DOCUMENTS", insert ----3617949   12/87   Germany----.

Signed and Sealed this

Fifth Day of September, 1995

Attest:

BRUCE LEHMAN

Attesting Officer        Commissioner of Patents and Trademarks